United States Patent
Xu et al.

(10) Patent No.: US 10,805,107 B2
(45) Date of Patent: Oct. 13, 2020

(54) BOARD REGISTRATION METHOD, BOARD, AND FORWARDING DEVICE

(71) Applicant: HUAWEI TECHNOLOGIES CO., LTD., Shenzhen, Guangdong (CN)

(72) Inventors: Xiaofei Xu, Beijing (CN); Qingzhi Liu, Beijing (CN); Xiaojun Zhang, Shenzhen (CN); Linchun Wang, Beijing (CN); Jingzhou Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/365,863

(22) Filed: Mar. 27, 2019

(65) Prior Publication Data

US 2019/0222436 A1 Jul. 18, 2019

Related U.S. Application Data

(63) Continuation of application No. PCT/CN2017/103680, filed on Sep. 27, 2017.

(30) Foreign Application Priority Data

Sep. 27, 2016 (CN) .......................... 2016 1 0855282

(51) Int. Cl.
*H04Q 11/00* (2006.01)
*H04L 12/28* (2006.01)
(Continued)

(52) U.S. Cl.
CPC .......... *H04L 12/2885* (2013.01); *H04L 12/00* (2013.01); *H04L 41/0806* (2013.01);
(Continued)

(58) Field of Classification Search
CPC .................................................. H04Q 11/0071
See application file for complete search history.

(56) References Cited

U.S. PATENT DOCUMENTS 5,675,735 A * 10/1997 Gallagher ............... H04L 12/44
709/228
6,809,258 B1 10/2004 Dang et al.
(Continued)

FOREIGN PATENT DOCUMENTS

CN 100373368 C 3/2008
CN 101631081 A 1/2010
(Continued)

OTHER PUBLICATIONS

Extended European Search Report issued in European Application No. 17854892.1 dated Jul. 3, 2019, 8 pages.
(Continued)

*Primary Examiner* — Shi K Li
(74) *Attorney, Agent, or Firm* — Fish & Richardson P.C.

(57) ABSTRACT

The present disclosure relates to registration methods and devices. One example method includes obtaining, by a line card, line card information of the line card, the line card comprising a fabric interface chip optically interconnected to a switch fabric chip in at least one switch fabric card by using an optical fiber, and sending, by the line card, the line card information to the at least one switch fabric card through an optical interconnect path. The at least one switch fabric card registers the line card based on the line card information.

16 Claims, 12 Drawing Sheets

(51) Int. Cl.
  *H04L 12/931* (2013.01)
  *H04L 12/24* (2006.01)
  *H04L 12/00* (2006.01)

(52) U.S. Cl.
  CPC ......... *H04L 49/40* (2013.01); *H04Q 11/0005* (2013.01); *H04Q 11/0062* (2013.01); *H04Q 2011/0052* (2013.01); *H04Q 2011/0064* (2013.01)

(56) References Cited

U.S. PATENT DOCUMENTS

| | | | |
|---|---|---|---|
| 2004/0042448 A1* | 3/2004 | Lebizay | .................. H04L 47/12 370/362 |
| 2011/0038371 A1 | 2/2011 | Lin | |
| 2011/0116755 A1 | 5/2011 | Rolston | |
| 2012/0014391 A1 | 1/2012 | Du et al. | |
| 2014/0112337 A1 | 4/2014 | Lam et al. | |
| 2015/0120622 A1* | 4/2015 | Kobatake | ................ H04L 45/54 706/12 |
| 2015/0186206 A1* | 7/2015 | Bhattacharya | ...... G06F 11/2035 714/3 |

FOREIGN PATENT DOCUMENTS

| | | |
|---|---|---|
| CN | 101895398 A | 11/2010 |
| CN | 102356598 A | 2/2012 |
| CN | 102754452 A | 10/2012 |
| CN | 104350709 A | 2/2015 |

OTHER PUBLICATIONS

PCT International Search Report and Written Opinion issued in International Application No. PCT/CN2017/103680 dated Jan. 8, 2018, 15 pages (with English translation).

Office Action issued in Chinese Application No. 201610855282.2 on Jul. 15, 2020, 5 pages.

* cited by examiner

| Message type | Line card type | Line card identity ID |
|---|---|---|
| Timestamp |||
| Line card capability parameter 1 |||
| ... |||
| Line card capability parameter n |||

| Message type | Existing line card type | Existing line card identity ID |
|---|---|---|
| New line card identity ID | Null ||
| Timestamp |||
| Existing line card capability parameter 1 |||
| ... |||
| Existing line card capability parameter n |||

| Message type | Null | Fabric card identity ID |
|---|---|---|
| Switch fabric card capability parameter 1 ||| 
| ... ||| 
| Switch fabric card capability parameter n |||

| Message type | Null | Fabric card identity ID |
|---|---|---|

BOARD REGISTRATION METHOD, BOARD, AND FORWARDING DEVICE

CROSS-REFERENCE TO RELATED APPLICATIONS

This application is a continuation of International Application No. PCT/CN2017/103680, filed on Sep. 27, 2017, which claims priority to Chinese Patent Application No. 201610855282.2, filed on Sep. 27, 2016, The disclosures of the aforementioned applications are hereby incorporated by reference in their entireties.

TECHNICAL FIELD

The present invention relates to the field of communications technologies, and in particular, to a board registration method, a board, and a forwarding device.

BACKGROUND

Currently, there is an increasingly high throughput requirement for a router. Considering a limited throughput of each line card, a plurality of line cards are usually placed inside one line card chassis, so as to meet the throughput requirement. In addition, a multi-chassis cluster is established, and a plurality of line card chassis are equipped with one central switching chassis. There is at least one local switch fabric card and line card in the line card chassis, and there is at least one central switch fabric card in the central switching chassis. The central switching chassis is optically interconnected to the local switch fabric card, and the local switch fabric card is electrically interconnected to a line card in a local chassis.

A limited quantity of line cards can be deployed in one line card chassis, and a multi-chassis cluster occupies a relatively large area. Although remote deployment of the line card chassis can be implemented through optical interconnection, each line card chassis needs to be additionally equipped with an optical module. Equipping with the optical module reduces integration of line cards deployed in the line card chassis, and after being equipped with the optical module, the line card chassis becomes quite heavy. It can be learned that, although an existing multi-chassis cluster can meet a relatively high throughput requirement, line card deployment cannot break through restrictions of a line card chassis and a local switch fabric card chassis, and cannot break through a restriction of a deployment position, either. Therefore, scalability is relatively poor.

SUMMARY

The present invention provides a board registration method, a board, and a forwarding device, so as to resolve a prior-art problem that deployment of a line card and a switch fabric card has relatively poor scalability.

The present invention provides a board registration method for deployment, which may specifically include line card registration and switch fabric card registration. The board registration method in the present invention is mainly applied to a forwarding device, where the forwarding device in the present invention includes at least one line card and at least one switch fabric card. The line card includes a fabric interface chip. The switch fabric card includes a switch fabric chip. The line card may be at least one of a router line card, a switch line card, an OTN line card, a PTN line card, or a programmable white box line card, and at least one of the router line card, the switch line card, the OTN line card, the PTN line card, or the programmable white box line card may be deployed in the forwarding device at the same time. The following separately describes the line card registration and the switch fabric card registration.

In a line card registration method, the fabric interface chip in the line card may be optically interconnected to the switch fabric chip in the at least one switch fabric card by using an optical fiber. The switch fabric card is configured to forward data sent by the line card, and forward, to the line card, data whose destination end is the line card. The line card obtains line card information of the line card, and then sends the line card information to the at least one switch fabric card through an optical interconnect path, so that the at least one switch fabric card registers the line card based on the line card information. The line card information includes a line card type, an operating status, and a line card capability parameter. Certainly, fabric card information of the switch fabric card may also be registered in the line card. If the line card receives a second registration message that carries fabric card information of a first switch fabric card and that is sent by the first switch fabric card, the line card records the fabric card information of the first switch fabric card and a fabric card identity of the first switch fabric card based on the second registration message, to complete registration of the first switch fabric card.

In a switch fabric card registration method, a switch fabric chip in the first switch fabric card is optically interconnected to the fabric interface chip of the at least one line card. For the switch fabric card registration, the first switch fabric card obtains the fabric card information of the first switch fabric card, and then sends the fabric card information to the at least one line card through an optical interconnect path, so that the at least one line card registers the first switch fabric card based on the fabric card information.

For the line card registration, the line card sends the line card information to the at least one switch fabric card through the optical interconnect path, and after receiving, through the optical interconnect path, the line card information of the line card sent by the line card, the first switch fabric card in the at least one switch fabric card may register the line card based on the line card information.

Compared with an existing mechanism, a mechanism in the present invention does not need to restrict the line card or the switch fabric card to a chassis or cabinet, so that problems such as relatively low integration, relatively poor heat dissipation, a high demand for power, and a large occupied area that are caused when the line card or the switch fabric card is restricted to the chassis or cabinet can be avoided. Moreover, deployment manners of the line card and the switch fabric card in the present invention are more flexible, and are free from geographical restrictions. Moreover, no local switch fabric card needs to be additionally deployed, and remote optical interconnection between the line card and the switch fabric card can be directly implemented by optically interconnecting the fabric interface chip in the line card to the switch fabric chip in the switch fabric card by using the optical fiber. Such a structure deployment manner in the present invention can effectively increase a throughput of the forwarding device.

In addition to the foregoing fabric interface chip deployed in the line card in the forwarding device, at least one chip may further be deployed in the line card. In addition, electrical interconnection may be implemented between the fabric interface chip and the chip and between the chips, or optical interconnection between the chips may be directly implemented by using an optical fiber, thereby further increasing a signal transmission rate.

Specifically, the fabric interface chip in the line card in the present invention includes at least one first silicon photonic chip, and the switch fabric chip in the switch fabric card includes at least one second silicon photonic chip. Therefore, the first silicon photonic chip and the second silicon photonic chip may be directly connected by using an optical fiber, to implement optical interconnection between the line card and the switch fabric card. For a connection manner in which the chips inside the line card are connected by using the optical fiber, refer to the manner in which the fabric interface chip is optically interconnected to the switch fabric chip by using the optical fiber. Similar parts are not described in detail again.

In some possible designs, for a reason such as an increasingly high throughput requirement, more line cards or switch fabric cards need to be added; or for a reason such as a service change, an existing optical interconnect path needs to be changed. In the present invention, mainly, the optical fiber is directly connected to the fabric interface chip in the line card, and the optical fiber is directly connected to the switch fabric chip in the switch fabric card. An additional optical cross-connect device may be added between the line card and the switch fabric card, or the line card and the switch fabric card may be connected directly by using the optical fiber. Architecture deployment mechanisms in the present invention can break through restrictions of the chassis, the cabinet, or the line card, thereby quickly completing deployment of a new line card or switch fabric card. The following separately describes scenarios of adding more line cards or switch fabric cards or changing an optical interconnect path in the two architectures.

Mechanism A: A line card and a switch fabric card are directly connected by using an optical fiber.

1. During deployment of a new line card, a fabric interface chip in the line card is optically interconnected to the switch fabric chip in the at least one switch fabric card by using the optical fiber, and then line card information of the line card is registered in the at least one switch fabric card that is optically interconnected to the fabric interface chip in the line card.

2. During deployment of a new first switch fabric card, a switch fabric chip in the first switch fabric card is optically interconnected to a fabric interface chip in each line card in the forwarding device by using the optical fiber.

In addition, the existing optical interconnect path may be changed. For example, to change an optical interconnect path between the fabric interface chip in the line card and the switch fabric chip in the switch fabric card, an optical fiber connected to a fabric interface chip in a line card 1 may be connected to a fabric interface chip in another line card 2, or may be directly unplugged; or an optical fiber connected to a switch fabric chip in a switch fabric card 1 may be connected to a switch fabric chip in another switch fabric card 2, or may be directly unplugged.

If the optical fiber that is originally connected to the switch fabric card 1 is connected to the switch fabric card 2, the line card information of the line card needs to be further registered in the changed switch fabric card 2.

If the optical fiber that is originally connected to the switch fabric card 1 is unplugged, or the optical fiber that is originally connected to the line card 1 is unplugged, the switch fabric card connected to the optical fiber further needs to delete locally stored line card information of the line card.

If the optical fiber that is originally connected to the line card 1 is connected to the line card 2, line card information of the line card 2 needs to be further registered in a switch fabric card that is connected to the optical fiber.

It can be learned that, according to the mechanism A, the new line card or the new switch fabric card can be flexibly deployed at any time, or the existing optical interconnect path can be flexibly changed. In addition, in this mechanism, in a scenario in which the line card and the switch fabric card are connected directly by using the optical fiber, no optical interface mapping relationship needs to be configured.

Mechanism B: A line card and a switch fabric card are connected by using an optical cross-connect device and an optical fiber.

In the mechanism B, a manner of optical interconnection between the line card and the switch fabric card is specifically represented as follows: The fabric interface chip in the line card is optically interconnected to the optical cross-connect device by using the optical fiber, the optical cross-connect device is optically interconnected to the switch fabric chip in the at least one switch fabric card by using the optical fiber, and then an optical interface mapping relationship between the line card and the at least one switch fabric card in the optical cross-connect device is configured.

1. During deployment of the line card, the fabric interface chip in the line card is optically interconnected to the optical cross-connect device by using the optical fiber, and then a first optical interface mapping relationship between the line card and the at least one switch fabric card is configured in the optical cross-connect device.

2. During deployment of the first switch fabric card, the optical cross-connect device is optically interconnected to the switch fabric chip in the first switch fabric card by using the optical fiber, and then a second optical interface mapping relationship between each line card and the first switch fabric card is configured in the optical cross-connect device, where the optical interface mapping relationship includes a mapping relationship between a port of the line card and an interface of the optical cross-connect device and a mapping relationship between the interface of the optical cross-connect device and a port of the first switch fabric card.

In addition, an optical interface mapping relationship between the line card and each switch fabric card in the forwarding device may be changed in the optical cross-connect device, so as to change an optical interconnect path between the line card and the switch fabric card. It can be learned that, with the optical cross-connect device, an existing optical fiber connection does not need to be changed, and only a locally configured optical interface mapping relationship needs to be changed, so as to achieve an objective of changing the optical interconnect path between the line card and the switch fabric card. This is efficient to operate, and further, there is no need to plug and unplug the optical fiber at a position of the line card or switch fabric card. Therefore, manual labor is saved.

In this mechanism, during the deployment of the new line card or the new switch fabric card, only an optical interface mapping relationship configured in the optical cross-connect device needs to be updated, and the existing optical fiber connection does not need to be changed. With the architecture deployment mechanism in the present invention, capacity expansion can be performed at any time after an architecture of the forwarding device has been deployed, and neither a deployment position nor a deployment quantity of boards (line cards or switch fabric cards) is limited. The present invention can break through restrictions of a chassis and geography, and increase a throughput without changing an original architecture. In addition, deployment is flexible, and problems such as relatively low integration, relatively poor heat dissipation, a high demand for power, and a large occupied area that are caused when the board is restricted to the chassis or cabinet can be avoided to some extent.

In the mechanism B, the forwarding device further includes a controller, the optical cross-connect device includes a control interface and at least two data interfaces, and the controller is communicatively connected to the control interface and a first data interface of the optical cross-connect device. The controller may be a device independent of the line card, the switch fabric card, and the optical cross-connect device, or may be a functional unit in the switch fabric card. The controller is configured to configure each optical interface mapping relationship in the forwarding device, and manage execution logic of the line card, the switch fabric card, and the optical cross-connect device by using the control interface. The method further includes at least one of the following:

When the fabric interface chip in the line card is optically interconnected to a second data interface of the optical cross-connect device, the optical cross-connect device forwards, to the controller by using the first data interface of the optical cross-connect device that is mapped to the second data interface, a first registration message that is sent by the line card, where the first registration message is used to request to register the line card information of the line card and configure the first optical interface mapping relationship.

Alternatively, when the switch fabric chip in the first switch fabric card is optically interconnected to a third data interface of the optical cross-connect device, the optical cross-connect device forwards, to the controller by using the first data interface that is mapped to the third data interface, a second registration message that is sent by the first switch fabric card, where the second registration message is used to request to register the fabric card information of the first switch fabric card and configure the second optical interface mapping relationship.

In addition, after the optical cross-connect device registers the line card information of the line card in the controller by using the first data interface, the controller configures the first optical interface mapping relationship for the line card based on the line card type and a line card identity of the line card, and then delivers the first optical interface mapping relationship to the optical cross-connect device by using the control interface that is connected to the controller, so that after receiving the first optical interface mapping relationship, the optical cross-connect device can locally configure the first optical interface mapping relationship, and accordingly update a local optical interface mapping relationship, thereby implementing real-time control of the optical cross-connect device and management of the optical interconnect path.

After the line card or the first switch fabric card has been deployed, if the optical cross-connect device still has an idle fourth data interface, in order to complete an entire registration procedure when a new line card or new switch fabric card is subsequently connected to the idle fourth data interface, the controller further needs to map the idle fourth data interface of the optical cross-connect device to the first data interface, so that when the new line card is connected to the fourth data interface, line card information is registered in the controller by using the first data interface, and an optical interface mapping relationship is configured; or the controller further needs to map the idle fourth data interface of the optical cross-connect device to the first data interface, so that when the new switch fabric card is connected to the fourth data interface, fabric card information is registered in the controller by using the first data interface, and an optical interface mapping relationship is configured; and finally, the optical cross-connect device can obtain, by using the control interface, the optical interface mapping relationship delivered by the controller.

In actual data transmission, when the foregoing optical interconnect path is used to transmit a data packet, because an optical fiber has a transmission delay, transmission delays from a same line card to different switch fabric cards may be different. Consequently, an out-of-order status is relatively severe when load of a plurality of packets of a same stream or a plurality of cells of a same packet is shared with a downlink destination end through different paths. To ensure data accuracy, resequencing is required, and a resequencing cache finally increases because of the transmission delay, causing relatively heavy load of the forwarding device. To reduce the resequencing cache, a delay mechanism may be predefined, so that a transmit end can perform, based on a transmission delay of a path, delay processing on data that is to be transmitted on the path, thereby reducing a difference between a delay of reaching the destination end and a delay of reaching another path, reducing an out-of-order degree, and further reducing the resequencing cache. A specific process is as follows:

After the optical interconnect path from the line card to the switch fabric card has been deployed, the line card may further calculate a path delay from the line card to a destination line card, and then send the data packet to the destination line card based on the path delay.

The calculating a path delay from the line card to a destination line card includes one of the following:

sending, by the line card in the forwarding device, a measurement packet to the destination line card through a designated path; receiving, through the designated path, the measurement packet returned by the destination line card, where the measurement packet carries a current system timestamp identifying when the line card sends the measurement packet; and calculating a delay of the designated path based on current system time and the timestamp, where the designated path includes a path from the line card to the destination switch fabric card and a path from the destination switch fabric card to the destination line card; or calculating, by the line card in the forwarding device, the path delay based on a propagation speed of an optical signal in an optical fiber, a length of an optical fiber from the line card to a destination switch fabric card, and a length of an optical fiber from the destination switch fabric card to the destination line card.

In addition, the line card can not only calculate a path delay of a single-stage switching network, but also calculate a path delay of a multi-stage switching network, where calculation manners of the path delay of the single-stage switching network and the path delay of the multi-stage switching network are the same.

During deployment of the board (including the new line card or the new switch fabric card), the new line card in the present invention can directly implement procedures of board identity application and board registration through a deployed optical interconnect path, with no need to use another control device to forward or process requests for board identity application and board registration. Therefore, compared with an existing mechanism, a mechanism in the present invention can further increase efficiency of the procedures of board identity application and board registration, and can implement mutual communication between boards when the boards are newly added to the forwarding device. In the present invention, the forwarding device includes a master switch fabric card, and a board identity of each board is allocated by the master switch fabric card or a controller. The following separately describes details of deployment of the foregoing line card and first switch fabric card.

When the line card is optically interconnected to a switch fabric card in the forwarding device, the line card may obtain the line card identity of the line card through the optical interconnect path. Specifically, the line card may send a first request message to the master switch fabric card through the optical interconnect path, where the first request message is used to request to obtain the line card identity of the line card. Then the master switch fabric card allocates the line card identity to the line card based on the first request message, and returns the allocated line card identity to the line card through the optical interconnect path.

Alternatively, when the first switch fabric card is optically interconnected to a worker line card or a switch fabric card in the forwarding device, the first switch fabric card may obtain the fabric card identity of the first switch fabric card through the optical interconnect path. Specifically, the first switch fabric card sends a second request message to the master switch fabric card through the optical interconnect path, where the second request message is used to request to allocate the fabric card identity to the first switch fabric card. After receiving the second request message, the master switch fabric card allocates the fabric card identity to the first switch fabric card, and returns the allocated fabric card identity to the first switch fabric card through the optical interconnect path, so that the first switch fabric card locally records the fabric card identity that is allocated to the first switch fabric card.

It should be noted that a mechanism for obtaining the board identity by using the foregoing first request message or second request message is applicable to both a scenario in which the line card and the switch fabric card are directly connected by using the optical fiber and a scenario in which the line card and the switch fabric card implement optical interconnection by using the optical cross-connect device.

In addition, after a deployed board operates for a period of time, communication between the board and a node in the forwarding device may be disconnected because the board is damaged, the optical fiber is damaged, a power supply of the board is cut off, or the like. After being successfully deployed, the board detects a connection status of another board that is optically interconnected to the board, and if it is detected that the connection status of the another board is disconnected, deletes all locally recorded information (including registered board information and a registered board identity, and the like) about the disconnected board. For example, when detecting that a switch fabric card that is optically interconnected to the line card is disconnected, the line card deletes all locally recorded information about the disconnected switch fabric card, and notifies all switch fabric cards that are optically interconnected to the line card of the information about the disconnected switch fabric card. After receiving a notification, these switch fabric cards determine whether the disconnected switch fabric card is the master switch fabric card, and if the disconnected switch fabric card is the master switch fabric card, reselect one switch fabric card from normally connected switch fabric cards as a new master switch fabric card.

For another example, when detecting that a line card that is optically interconnected to the switch fabric card is disconnected, the switch fabric card deletes all locally recorded information about the disconnected line card. If the switch fabric card is the master switch fabric card, after releasing the board identity that is allocated to the board, the master switch fabric card further needs to notify all line cards that are optically interconnected to the master switch fabric card of the information about the disconnected line card, or the master switch fabric card may notify all line cards or switch fabric cards in a multi-stage switching network that are optically interconnected to the master switch fabric card of the information about the disconnected line card.

Specifically, in a scenario in which optical interconnection is implemented by using the optical cross-connect device, when detecting that the new line card is disconnected from the optical cross-connect device, a switch fabric card that is optically interconnected to the new line card may release a locally recorded line card identity that is allocated to the new line card, so that the line card identity is allocated to a subsequent new line card, thereby implementing recycling.

Alternatively, when detecting that the new switch fabric card is disconnected from the optical cross-connect device, a line card that is optically interconnected to the new switch fabric card releases a locally recorded fabric card identity that is allocated to the new switch fabric card.

The following separately describes registration procedures for cases in which the new line card goes online and the new switch fabric card goes online.

1. After the line card receives the line card identity that is allocated by the master switch fabric card, the line card sends the first registration message that carries the line card information of the line card and the line card identity of the line card to a worker switch fabric card that is optically interconnected to the line card, where the first registration message may further carry a current system timestamp identifying when the new line card sends the first registration message.

After receiving the first registration message, the worker switch fabric card records the line card information of the line card and the line card identity of the line card based on the first registration message, adds a fabric card identity of the worker switch fabric card into the first registration message, and then forwards the first registration message into which the fabric card identity of the worker switch fabric card is added to a line card that is optically interconnected to the worker switch fabric card.

After recording line card information of the new line card, the line card that is optically interconnected to the worker switch fabric card may further return a generated first registration acknowledgement response to the line card through an optical interconnect path. The first registration acknowledgement response carries the current system timestamp identifying when the line card sends the first registration message, and after receiving the first registration response sent by the worker switch fabric card, the line card may calculate a delay of a transmission path based on the timestamp.

2. After the first switch fabric card receives the fabric card identity allocated by the master switch fabric card, the first switch fabric card sends the second registration message to a worker line card that is optically interconnected to the first switch fabric card, where the second registration message carries the fabric card information of the first switch fabric card and the fabric card identity of the first switch fabric card. When the first switch fabric card is in the multi-stage switching network, the second registration message may be further sent to the switch fabric card that is optically interconnected to the first switch fabric card.

After recording the fabric card information of the first switch fabric card, the foregoing worker line card forwards the second registration message to a switch fabric card that is optically interconnected to the worker line card.

After recording the fabric card information of the first switch fabric card and the fabric card identity of the first switch fabric card, the switch fabric card that is optically interconnected to the worker line card may further return a generated second registration acknowledgement response to the first switch fabric card through the optical interconnect path. The second registration response may carry fabric card information of switch fabric cards in the optical interconnect path at which the first switch fabric card is located.

In addition, the switch fabric card may change an operating status of the line card in real time. For example, when the first switch fabric card in the forwarding device receives a notification message whose message type is an operating status, the first switch fabric card in the forwarding device updates the locally recorded operating status of the line card based on the notification message, and may further forward the notification message to a line card that is optically interconnected to the first switch fabric card. The first switch fabric card that participates in forwarding of the notification message may include a master switch fabric card and/or a slave switch fabric card. If the first switch fabric card is the worker switch fabric card described in the foregoing content, because the worker switch fabric card may include all switch fabric cards that are optically interconnected to the new line card directly or indirectly on the optical interconnect path at which the new line card is located, the optical interconnect path at which the new line card is located may be a single-stage switching network, or may be a multi-stage switching network. In this case, when the notification message is sent to one (for example, the first switch fabric card) of the switch fabric cards, the switch fabric card not only forwards the notification message to a line card that is optically interconnected to the switch fabric card, but also forwards the notification message to a switch fabric card that is optically interconnected to the switch fabric card.

A second aspect of the present invention provides a line card, which has a function of implementing the line card registration method provided in the foregoing first aspect. The function may be implemented by hardware, or may be implemented by executing corresponding software by hardware. The hardware or the software includes one or more modules corresponding to the foregoing function, and the module may be software and/or hardware.

In some designs, the line card includes a processor and a fabric interface chip, and the fabric interface chip is optically interconnected to a switch fabric chip in at least one switch fabric card by using an optical fiber.

The fabric interface chip is configured to: obtain line card information of the line card, and send the line card information to the at least one switch fabric card through an optical interconnect path, so that the at least one switch fabric card registers the line card based on the line card information.

Before obtaining the line card information of the line card, the fabric interface chip is further configured to obtain a line card identity of the line card through the optical interconnect path. If the at least one switch fabric card includes a master switch fabric card, the fabric interface chip is specifically configured to: first send a first request message to the master switch fabric card through the optical interconnect path, where the first request message is used to request to obtain the line card identity of the line card; and then receive, through the optical interconnect path, a first request response that is returned by the master switch fabric card, where the first request response carries the line card identity that is allocated to the line card by the master switch fabric card based on the first request message.

In some possible designs, the fabric interface chip is specifically configured to: after receiving the line card identity that is allocated by the master switch fabric card, send a first registration message to the worker switch fabric card that is optically interconnected to the line card, where the first registration message carries the line card information of the line card and the line card identity of the line card, so that the worker switch fabric card records the line card information of the line card and the line card identity of the line card based on the first registration message, where the worker switch fabric card is a switch fabric card in the at least one switch fabric card.

After sending the first registration message to the worker switch fabric card that is optically interconnected to the line card, the fabric interface chip may further receive a first registration acknowledgement response sent by the worker switch fabric card, where the first registration acknowledgement response is generated by a line card that is optically interconnected to the worker switch fabric card, and the first registration acknowledgement response carries line card information of line cards in an optical interconnect path at which the line card is located.

The first registration message further carries a current system timestamp identifying when the line card sends the first registration message, and the first registration acknowledgement response carries the timestamp.

In some designs, the line card may further register a first switch fabric card.

Specifically, the fabric interface chip receives a second registration message sent by the first switch fabric card that is optically interconnected to the line card, where the second registration message carries fabric card information of the first switch fabric card and a fabric card identity of the first switch fabric card; and then the processor records the fabric card information of the first switch fabric card and the fabric card identity of the first switch fabric card based on the second registration message.

After the processor records the fabric card information of the first switch fabric card and the fabric card identity of the first switch fabric card, the fabric interface chip may further forward the second registration message to a switch fabric card that is optically interconnected to the line card, so that the switch fabric card that is optically interconnected to the line card records the fabric card information of the first switch fabric card and the fabric card identity of the first switch fabric card.

In addition, after the line card forwards the second registration message to the switch fabric card that is optically interconnected to the line card, the fabric interface chip may further receive a first registration response sent by the worker switch fabric card, where the first registration response is generated by the line card that is optically interconnected to the worker switch fabric card, and the second registration response carries the line card information of line cards in the optical interconnect path at which the line card is located.

To reduce a data sequencing problem caused by load sharing paths, after registration is complete, the processor may further calculate a path delay from the line card to a destination line card, and send a data packet to the destination line card based on the path delay. The path delay is calculated mainly in one of the following manners:

sending, by the fabric interface chip, a measurement packet to the destination line card through a designated path, and receiving, through the designated path, the measurement packet returned by the destination line card, where the measurement packet carries a current system timestamp identifying when the line card sends the measurement packet; and then calculating, by the processor, a delay of the designated path based on current system time and the timestamp, where the designated path includes a path from the line card to the destination switch fabric card and a path from the destination switch fabric card to the destination line card; or calculating, by the processor, the path delay based on a propagation speed of an optical signal in an optical fiber, a length of an optical fiber from the line card to a destination switch fabric card, and a length of an optical fiber from the destination switch fabric card to the destination line card.

In some possible designs, when it is detected that the switch fabric card that is optically interconnected to the line card is disconnected, the processor may further release a locally recorded fabric card identity that is allocated to the disconnected switch fabric card.

In some possible designs, an optical cross-connect device may be introduced into a forwarding device. When the fabric interface chip is optically interconnected to the optical cross-connect device, the fabric interface chip sends the first registration message to the optical cross-connect device, so that the optical cross-connect device forwards the first registration message to a controller, where the first registration message is used to request to register the line card information of the first line card and configure a first optical interface mapping relationship, and the first optical interface mapping relationship is an optical interface mapping relationship between the first line card and the at least one switch fabric card.

The second aspect of the present invention further provides a first switch fabric card, which has a function of implementing the switch fabric card registration method provided in the foregoing first aspect. The function may be implemented by hardware, or may be implemented by executing corresponding software by hardware. The hardware or the software includes one or more modules corresponding to the foregoing function, and the module may be software and/or hardware.

The first switch fabric card includes a processor and a switch fabric chip, where the switch fabric chip is optically interconnected to a fabric interface chip of at least one line card;

the switch fabric chip is configured to receive, through an optical interconnect path, line card information of the line card sent by the line card; and the processor is configured to register the line card based on the line card information.

Specifically, the switch fabric chip receives a first registration message sent by a line card that is optically interconnected to the first switch fabric card, where the first registration message carries the line card information of the line card and a line card identity of the line card; and then the processor records the line card information of the line card and the line card identity of the line card based on the first registration message.

In some designs, after the first switch fabric card records the line card information of the line card and the line card identity of the line card based on the first registration message, the processor may further add a fabric card identity of the first switch fabric card into the first registration message, and then the switch fabric chip forwards the first registration message into which the fabric card identity of the first switch fabric card is added to a line card that is optically interconnected to the first switch fabric card, so that the line card that is optically interconnected to the first switch fabric card records the line card information.

After the switch fabric chip forwards the first registration message into which the fabric card identity of the first switch fabric card is added to the line card that is optically interconnected to the first switch fabric card, the switch fabric chip is further configured to:

after receiving a first registration acknowledgement response, forward the first registration acknowledgement response to the line card, where the first registration acknowledgement response is generated by the line card that is optically interconnected to the first switch fabric card, and the first registration acknowledgement response carries line card information of line cards in an optical interconnect path at which the line card is located.

In some designs, after the first switch fabric card goes online, the first switch fabric card further needs to be registered. Accordingly, the switch fabric chip is further configured to: obtain fabric card information of the first switch fabric card, and send the fabric card information of the first switch fabric card to the at least one line card through the optical interconnect path, so that the at least one line card registers the first switch fabric card based on the fabric card information.

Before obtaining the fabric card information of the first switch fabric card, the switch fabric chip may be further configured to obtain the fabric card identity of the first switch fabric card through the optical interconnect path.

If the at least one second switch fabric card includes a master switch fabric card, the switch fabric chip is specifically configured to:

send a second request message to the master switch fabric card through the optical interconnect path, where the second request message is used to request to obtain the fabric card identity of the first switch fabric card; and receive a second request response through the optical interconnect path, where the second request response carries the fabric card identity that is allocated to the first switch fabric card by the master switch fabric card based on the second request message.

In some designs, the switch fabric chip is specifically configured to send the second registration message to a worker line card that is optically interconnected to the first switch fabric card, where the second registration message carries the fabric card information of the first switch fabric card and the fabric card identity of the first switch fabric card, so that the worker line card records the fabric card information of the first switch fabric card and the fabric card identity of the first switch fabric card, where the worker line card is a line card in the at least one line card.

After sending the second registration message to the worker line card that is optically interconnected to the first switch fabric card, the switch fabric chip may be further configured to:

receive a second registration acknowledgement response sent by the worker line card, where the second registration acknowledgement response is generated by a switch fabric card that is optically interconnected to the worker line card, and the second registration response carries fabric card information of switch fabric cards in the optical interconnect path at which the first switch fabric card is located.

In some designs, when it is detected that the line card that is optically interconnected to the first switch fabric card is disconnected, the processor may further release a locally recorded line card identity that is allocated to the disconnected line card.

In some designs, when the first switch fabric card receives a notification message whose message type is an operating status, the processor updates a locally recorded operating status of the line card based on the notification message, and forwards, by using the switch fabric chip, the notification message to the line card that is optically interconnected to the first switch fabric card.

In some designs, if an optical cross-connect device is introduced into a forwarding device, when the switch fabric chip is optically interconnected to the optical cross-connect device, the switch fabric chip may be further configured to send the second registration message to the optical cross-connect device, so that the optical cross-connect device forwards the second registration message to a controller that is communicatively connected to the optical cross-connect device, where the second registration message is used to request to register the fabric card information of the first switch fabric card and configure a second optical interface mapping relationship, and the second optical interface mapping relationship is an optical interface mapping relationship between the at least one line card and the first switch fabric card.

A third aspect further provides a forwarding device, where the forwarding device includes at least one line card and at least one switch fabric card, the line card includes a fabric interface chip, and the switch fabric card includes a switch fabric chip; and the fabric interface chip in the line card is optically interconnected to the switch fabric chip in the at least one switch fabric card by using an optical fiber, and the switch fabric card is configured to forward data sent by the line card, and forward, to the line card, data whose destination end is the line card.

The at least one line card includes at least one of a router line card, a switch line card, an optical transport network OTN line card, a packet transport network PTN line card, or a programmable white box line card.

The line card further includes at least one chip, and the fabric interface chip is electrically and/or optically interconnected in series to the at least one chip.

Specifically, the fabric interface chip in the line card includes at least one first silicon photonic chip, and the switch fabric chip in the switch fabric card includes at least one second silicon photonic chip; and the first silicon photonic chip and the second silicon photonic chip are optically interconnected to each other by using an optical fiber.

If an optical cross-connect device is further introduced into the forwarding device, the fabric interface chip in the line card is optically interconnected to the optical cross-connect device by using an optical fiber; and the optical cross-connect device is optically interconnected to the switch fabric chip in the at least one switch fabric card by using an optical fiber.

Compared with the prior art, in the solutions provided in the present invention, the fabric interface chip is optically interconnected to the switch fabric chip by using the optical fiber, so that the line card and the switch fabric card can quickly register each other without using another auxiliary device, thereby breaking through the restrictions of the chassis/cabinet and the deployment position and accordingly increasing deployment efficiency.

BRIEF DESCRIPTION OF DRAWINGS

FIG. 2-1 is a schematic architectural diagram of optical interconnection between a line card and a switch fabric card according to an embodiment;

FIG. 2-2 is a schematic diagram of a connection manner of chips inside a line card according to an embodiment;

FIG. 2-3 is a schematic diagram of another connection manner of chips inside a line card according to an embodiment;

FIG. 3-1 is another schematic architectural diagram of a forwarding device according to an embodiment;

FIG. 3-2 is a schematic structural diagram of a first registration message according to an embodiment;

FIG. 3-3 is a schematic structural diagram of a registration ACK message according to an embodiment;

FIG. 3-4 is a schematic structural diagram of a registration message according to an embodiment;

FIG. 3-5 is a schematic structural diagram of an ID grant message according to an embodiment;

FIG. 3-6 is a schematic structural diagram of a notification message according to an embodiment;

FIG. 3-7 is another schematic architectural diagram of a forwarding device according to an embodiment;

FIG. 3-8 is a schematic diagram of a recording manner of fabric card information according to an embodiment;

FIG. 3-9 is another schematic structural diagram of a notification message according to an embodiment;

FIG. 4 is another schematic architectural diagram of a forwarding device according to an embodiment;

FIG. 5 is a schematic diagram of mapping between interfaces inside a forwarding device according to an embodiment;

FIG. 5-1 is a schematic diagram of a transmission path from a line card transmit end to a line card receive end inside a forwarding device according to an embodiment;

FIG. 5-2 is a schematic diagram of performing delay processing on a data packet in a forwarding device according to an embodiment;

FIG. 6 is a schematic diagram of mapping between interfaces in a multistage switching network according to an embodiment;

FIG. 7 is a schematic diagram of a registration procedure in a multi-stage switching network according to an embodiment;

FIG. 8 is a schematic structural diagram of a line card according to an embodiment;

FIG. 9 is a schematic structural diagram of a first switch fabric card according to an embodiment;

FIG. 10-1 is another schematic structural diagram of a forwarding device according to an embodiment.

DESCRIPTION OF EMBODIMENTS

Figure 1:
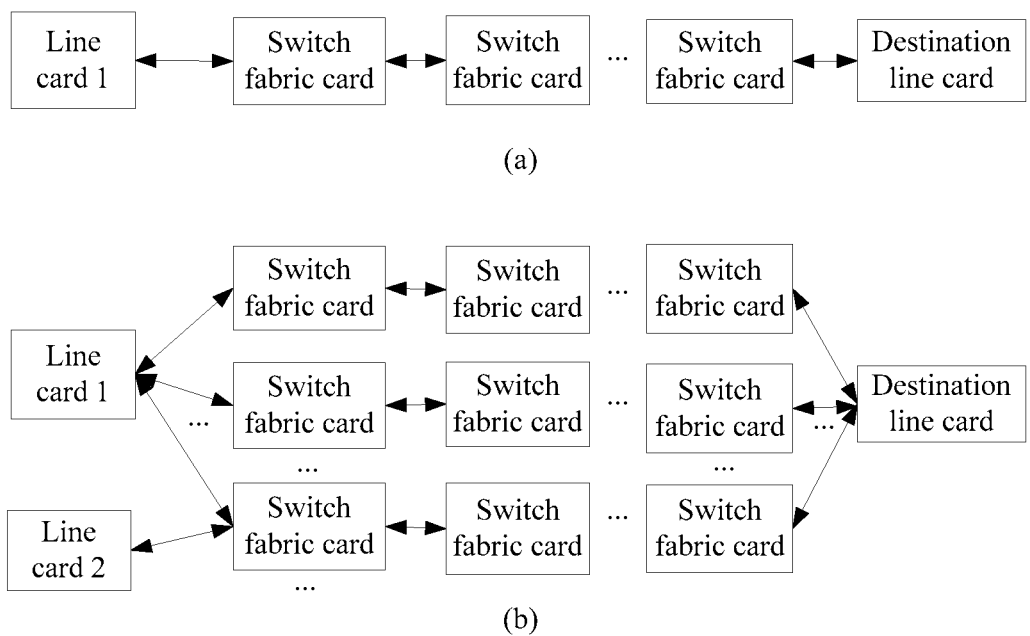
FIG. 1 is two schematic architectural diagrams of a forwarding device according to an embodiment.

The following describes the technical solutions in the embodiments of the present invention clearly with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In this specification, the claims, and the accompanying drawings of the present invention, the terms "first", "second", and so on are intended to distinguish between similar objects but do not necessarily indicate a particular order or sequence. It should be understood that the data termed in such a way is interchangeable in proper circumstances, so that the embodiments of the present invention described herein can be implemented in other orders than the order illustrated or described herein. Moreover, the terms "include", "contain" and any other variants mean to cover a non-exclusive inclusion, for example, a process, method, system, product, or device that includes a series of steps or modules is not necessarily limited to those expressly listed steps or modules, but may include other steps or modules that are not expressly listed or that are inherent to such a process, method, product, or device. The module division in this specification is merely logical division and may be other division in actual implementation. For example, a plurality of modules may be combined or may be integrated into another system, or some features may be ignored or not performed. In addition, the displayed or discussed mutual couplings or direct couplings or communicative connections may be implemented by using some interfaces. The indirect couplings or communicative connections between the modules may be implemented in electrical or other forms. This is not limited in this specification. In addition, the modules or submodules described as separate parts may or may not be physically separate, may or may not be physical modules, or may be distributed in a plurality of circuit modules. Some or all of the modules may be selected according to actual needs to achieve the objectives of the solutions in the embodiments of the present invention.

Embodiments of the present invention provide an architecture deployment method for a forwarding device and a forwarding device, and are applied to the field of communications technologies. Detailed descriptions are given below.

The present invention may be applied to a single-stage switching network and a multi-stage switching network. The multi-stage switching network refers to a topological architecture formed by optical interconnect paths that are deployed according to the present invention, for example, an architecture (a) shown in FIG. 1 or an architecture (b) shown in FIG. 1. A line card 1 may be directly connected to at least one switch fabric card by using an optical fiber, and the switch fabric card optically interconnected to the line card 1 may be directly connected to at least one line card by using an optical fiber, or may be directly connected to at least one switch fabric card by using an optical fiber.

An optical interface mapping relationship in this specification is a logical mapping relationship between physical interfaces that are connected by using an optical fiber.

To resolve the foregoing technical problems, the embodiments of the present invention mainly provide the following technical solution:

A fabric interface chip in a line card is connected to a switch fabric chip in a switch fabric card by using an optical fiber, and then line card information of the line card and fabric card information of the switch fabric card are registered separately. Subsequently, when a new line card needs to be deployed, a fabric interface chip in the new line card is also connected to the switch fabric chip in the switch fabric card by using an optical fiber; or when a new switch fabric card is deployed, the fabric interface chip in the line card is connected to a switch fabric chip in the new switch fabric card by using an optical fiber. Certainly, a new line card and a new switch fabric card may also be deployed at the same time. A deployment quantity and position are not limited in the present invention. In addition, in a scenario of a plurality of line cards and a plurality of switch fabric cards, or on the premise that a new line card or a new switch fabric card is deployed, an existing optical interconnect path may further be changed.

The foregoing technical solution can break through restrictions of a chassis or cabinet and a deployment position, thereby quickly completing deployment, and the deployment does not affect the existing optical interconnect path.

Figure 2:
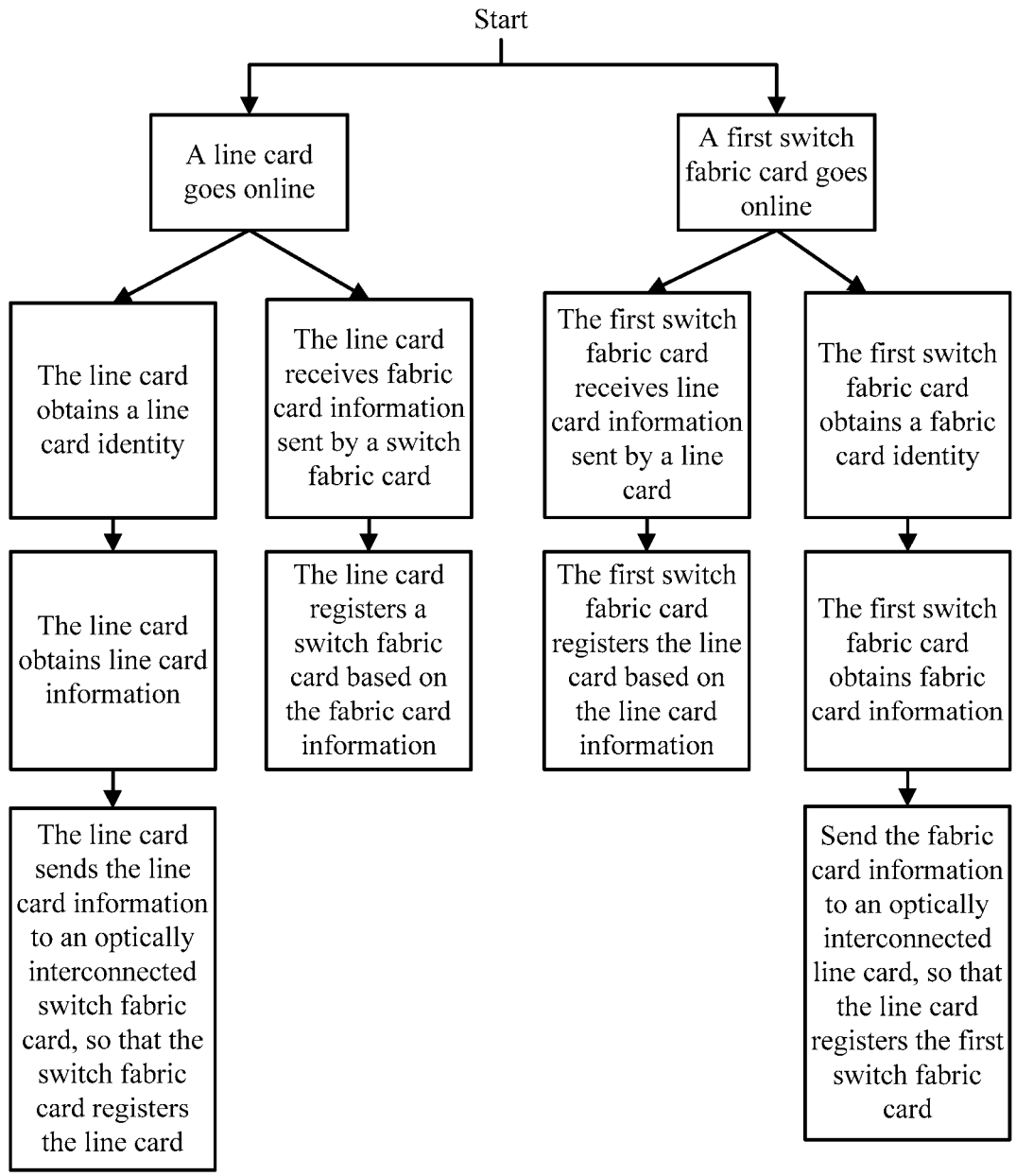
FIG. 2 is a schematic flowchart of an architecture deployment method for a forwarding device according to an embodiment.
Figures 1, 2:
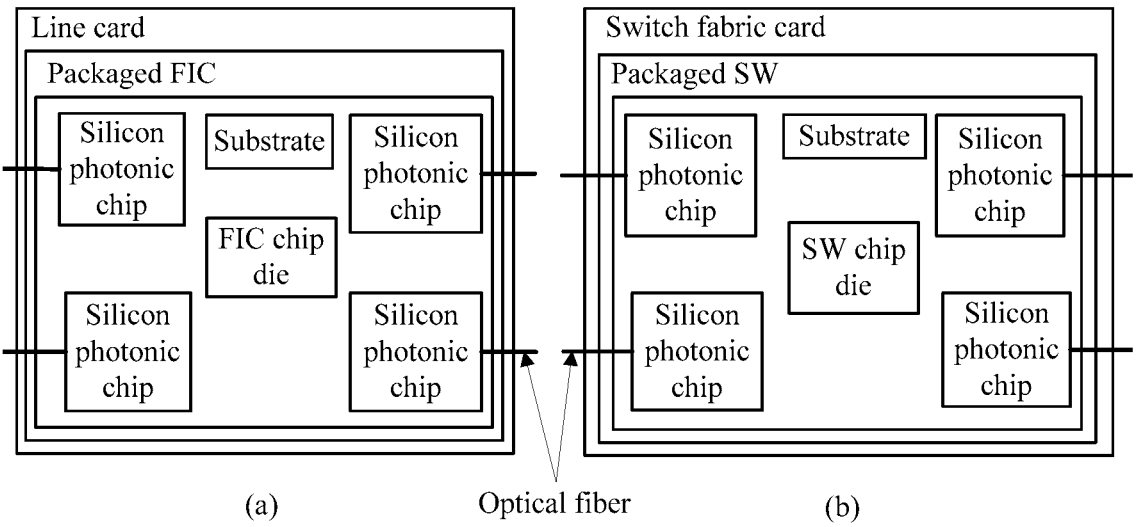
Figure 2:
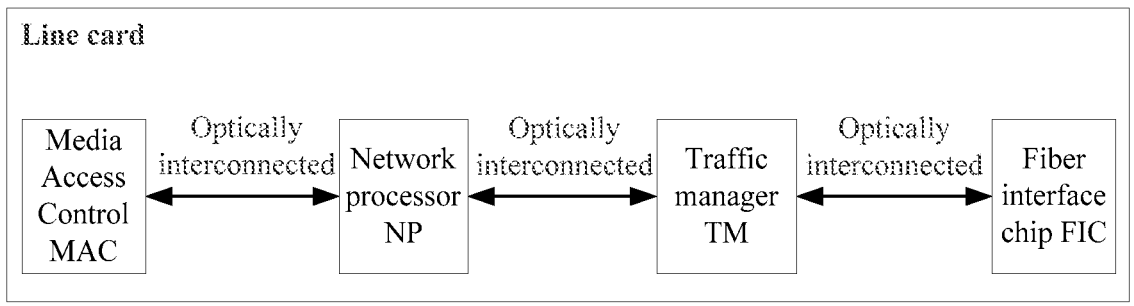

A board registration method in the present invention mainly includes line card registration and switch fabric card registration. The board registration method in the present invention is mainly applied to a forwarding device. The forwarding device mainly includes at least one line card and at least one switch fabric card. The switch fabric card is configured to forward data sent by the line card, and forward, to the line card, data whose destination end is the line card. The line card includes at least a fabric interface chip. The fabric interface chip in the line card may include a fabric interface chip (FIC for short) or a switch fabric chip (SW for short), and the switch fabric card includes an SW. As shown in FIG. 2, the following separately describes line card registration and switch fabric card registration. This embodiment of the present invention includes the following content:

First, a board obtains a board identity of the board, and obtains board information of the board by using the board identity.

If a new line card is deployed, a fabric interface chip in the line card may be optically interconnected to a switch fabric chip in the at least one switch fabric card by using an optical fiber, and after being successfully connected, the line card may first obtain line card information of the line card. If a new first switch fabric card is deployed, a switch fabric chip in the first switch fabric card may be optically interconnected to a fabric interface chip in the at least one line card by using an optical fiber, and after being successfully connected, the first switch fabric card may first obtain fabric card information of the switch fabric card.

In the present invention, the FIC in the line card may include at least one first silicon photonic chip and one FIC die (die), and each first silicon photonic chip can be configured to send and receive a signal. The SW in the switch fabric card includes at least one second silicon photonic chip and one SW die (die), and each second silicon photonic chip can be configured to send and receive a signal. The first silicon photonic chip and the second silicon photonic chip are optically interconnected to each other by using an optical fiber. The FIC in the line card may have a structure (a) shown in FIG. 2-1. It can be learned from the structure (a) in FIG. 2-1 that the FIC in the line card includes four silicon photonic chips and one FIC die, and the four silicon photonic chips and the one FIC die are deployed on a same substrate and packaged into the FIC. The silicon photonic chips (1 to 4) are configured to send and receive an optical signal or an electrical signal.

The SW in the switch fabric card may have a structure (b) shown in FIG. 2-1. It can be learned from the structure (b)

in FIG. 2-1 that the SW in the switch fabric card includes four silicon photonic chips and one SW die, and the four silicon photonic chips and the one SW die are deployed on a same substrate and packaged into the SW. The four silicon photonic chips (5 to 8) are configured to receive an optical signal sent by the FIC and forward the optical signal of the FIC to a next hop, or may send a received optical signal to the FIC.

Second, after obtaining the board information of the board, the board initiates a board registration procedure.

If the line card is deployed, the line card needs to be registered in at least one switch fabric card that is optically interconnected to the line card and that is currently managed by the forwarding device. The line card may send the line card information to the at least one switch fabric card through an optical interconnect path, so that the at least one switch fabric card registers the line card. Fabric card information of a switch fabric card may also be registered in the line card. If the line card receives a second registration message that carries the fabric card information of the first switch fabric card and that is sent by the first switch fabric card, the line card records the fabric card information of the first switch fabric card and a fabric card identity of the first switch fabric card based on the second registration message, to complete registration of the first switch fabric card.

The line card information includes a line card type, an operating status, and a line card capability parameter. The line card type is a functional type of a line card. Based on the line card type, the line card may be classified into a router line card, a switch line card, an optical transport network (OTN for short) line card, a packet transport network (PTN for short) line card, and a programmable white box line card. A forwarding device may include at least one of the router line card, the switch line card, the OTN line card, the PTN line card, or the programmable white box line card.

The operating status is a current status of a line card, and may include states such as Ready, Reboot, Error, Down, and Dump.

The capability parameter is an attribute or a capability of a line card, for example, a port quantity and a port rate of the switch line card, a layer 3 forwarding capability of the router line card, a bitmap (bitmap) of forwarding features supported by the router line card (each bit in the bitmap of the forwarding features represents one feature, and if a value of the bit is 1, it indicates that the router line card supports the feature), a southbound interface protocol supported by the programmable white box line card, capabilities such as available entry space and instruction space of the white box line card (for example, a port quantity and a port rate of the line card), or the like.

In addition, the line card may further include at least one chip (the chip may be a Media Access Control interface chip, a network processor, or a process management chip), and the fabric interface chip is electrically and/or optically interconnected in series to the chips. For a connection manner in which digital chips inside the line card are connected by using an optical fiber, refer to the manner in which the fabric interface chip is optically interconnected to the switch fabric chip by using the optical fiber. Similar parts are not described in detail again. Specifically, a connection manner of the chips inside the line card may be determined based on factors such as actual product design or service requirements, and functional chips inside the line card may be combined as required. A specific connection manner and a specific chip type and quantity are not limited in the present invention. For the specific connection manner, refer to optical interconnection between chips shown in FIG. 2-2, and a combination of optical interconnection and electrical interconnection between chips shown in FIG. 2-3.

If the first switch fabric card is deployed, the first switch fabric card needs to be registered in at least one line card that is optically interconnected to the first switch fabric card and that is currently managed by the forwarding device. The first switch fabric card may send the fabric card information of the first switch fabric card to the at least one line card through an optical interconnect path, so that the at least one line card registers the first switch fabric card. The first switch fabric card may further register a line card. If the first switch fabric card receives line card information sent by another line card, the first switch fabric card registers the line card.

Compared with an existing mechanism, a mechanism in the present invention does not need to restrict the line card or the switch fabric card to a chassis or cabinet, so that problems such as relatively low integration, relatively poor heat dissipation, a high demand for power, and a large occupied area that are caused when the line card or the switch fabric card is restricted to the chassis or cabinet can be avoided. Moreover, deployment manners of the line card and the switch fabric card in the present invention are more flexible, and are free from geographical restrictions. Moreover, no local switch fabric card needs to be additionally deployed, and remote optical interconnection between the line card and the switch fabric card can be directly implemented by optically interconnecting the fabric interface chip in the line card to the switch fabric chip in the switch fabric card by using the optical fiber. Such a structure deployment manner in the present invention can effectively increase a throughput of the forwarding device.

In addition, during deployment of the board (including the line card or the switch fabric card), the line card in the present invention can directly implement procedures of board identity application and board registration through a deployed optical interconnect path, without no need to use another control device to forward or process requests for board identity application and board registration. Therefore, compared with an existing mechanism, the mechanism in the present invention can further increase efficiency of the procedures of board identity application and board registration, and can implement mutual communication between boards when the boards are newly added to the forwarding device. In the present invention, the forwarding device includes a master switch fabric card, and a board identity of each board is allocated by the master switch fabric card or a controller. The following separately describes details of deployment of the foregoing line card and first switch fabric card.

When the line card is optically interconnected to the switch fabric card in the forwarding device, the line card may obtain a line card identity of the line card through an optical interconnect path. Specifically, the line card may send a first request message to the master switch fabric card through the optical interconnect path, where the first request message is used to request to allocate the line card identity to the line card. After receiving the first request message, the master switch fabric card allocates the line card identity to the line card based on the first request message, and returns the allocated line card identity to the line card through the optical interconnect path, so that the line card locally records the line card identity that is allocated to the line card.

Alternatively, when the first switch fabric card is optically interconnected to a worker line card or a switch fabric card in the forwarding device, the first switch fabric card may obtain the fabric card identity of the first switch fabric card through an optical interconnect path. Specifically, the first switch fabric card sends a second request message to the master switch fabric card through the optical interconnect path, where the second request message is used to request to allocate the fabric card identity to the first switch fabric card. After receiving the second request message, the master switch fabric card allocates the fabric card identity to the first switch fabric card, and returns the allocated fabric card identity to the first switch fabric card through the optical interconnect path, so that the first switch fabric card locally records the fabric card identity that is allocated to the first switch fabric card.

It should be noted that a mechanism for obtaining the board identity by using the foregoing first request message or second request message is applicable to both a scenario in which the line card and the switch fabric card are directly connected by using an optical fiber and a scenario in which the line card and the switch fabric card implement optical interconnection by using an optical cross-connect device.

In addition, after a deployed board operates for a period of time, communication between the board and a node in the forwarding device may be disconnected because the board is damaged, the optical fiber is damaged, a power supply of the board is cut off, or the like. After being successfully deployed, the board detects a connection status of another board that is optically interconnected to the board, and if it is detected that the connection status of the another board is disconnected, deletes all locally recorded information (including registered board information and a registered board identity, and the like) about the disconnected board. For example, when detecting that a switch fabric card that is optically interconnected to the line card is disconnected, the line card deletes all locally recorded information about the disconnected switch fabric card, and notifies all switch fabric cards that are optically interconnected to the line card of the information about the disconnected switch fabric card. After receiving a notification, these switch fabric cards determine whether the disconnected switch fabric card is the master switch fabric card, and if the disconnected switch fabric card is the master switch fabric card, reselect one switch fabric card from normally connected switch fabric cards as a new master switch fabric card.

For another example, when detecting that a line card that is optically interconnected to the switch fabric card is disconnected, the switch fabric card deletes all locally recorded information about the disconnected line card. If the switch fabric card is the master switch fabric card, after releasing the board identity that is allocated to the board, the master switch fabric card further needs to notify all line cards that are optically interconnected to the master switch fabric card of the information about the disconnected line card, or the master switch fabric card may notify all line cards or switch fabric cards in a multi-stage switching network that are optically interconnected to the master switch fabric card of the information about the disconnected line card.

Specifically, in a scenario in which optical interconnection is implemented by using the optical cross-connect device, when detecting that the line card is disconnected, a switch fabric card that is optically interconnected to the line card may release a locally recorded line card identity that is allocated to the line card, so that the line card identity is allocated to a subsequent new line card, thereby implementing recycling.

Alternatively, when detecting that the first switch fabric card is disconnected, a line card that is optically interconnected to the first switch fabric card releases a locally recorded fabric card identity that is allocated to the first switch fabric card.

The following separately describes registration procedures for cases in which the new line card goes online and the new switch fabric card goes online.

1. After the line card receives the line card identity that is allocated by the master switch fabric card, the line card sends a first registration message that carries the line card information of the line card and the line card identity of the line card to a worker switch fabric card that is optically interconnected to the line card, where the first registration message may further carry a current system timestamp identifying when the line card sends the first registration message.

After recording the line card information of the line card and the line card identity of the line card based on the first registration message, the worker switch fabric card first adds a fabric card identity of the worker switch fabric card into the first registration message, and then forwards the first registration message into which the fabric card identity of the worker switch fabric card is added to a line card that is optically interconnected to the worker switch fabric card.

After recording the line card information of the line card and the line card identity of the line card, the line card that is optically interconnected to the worker switch fabric card may further return a generated first registration acknowledgement response to the line card through an optical interconnect path. The first registration acknowledgement response may carry line card information of line cards in the optical interconnect path at which the line card is located, and carry the current system timestamp identifying when the line card sends the first registration message. The timestamp may be used by the line card to calculate a delay of a transmission path.

2. After the first switch fabric card receives the fabric card identity allocated by the master switch fabric card, the first switch fabric card sends, to a worker line card that is optically interconnected to the first switch fabric card, the second registration message that carries the fabric card information of the first switch fabric card and the fabric card identity of the first switch fabric card. If the first switch fabric card is in the multi-stage switching network, the first switch fabric card may further send the second registration message to a switch fabric card that is optically interconnected to the first switch fabric card.

After recording the fabric card information of the first switch fabric card and the fabric card identity of the first switch fabric card, the foregoing worker line card forwards the second registration message to a switch fabric card that is optically interconnected to the worker line card.

After receiving the second registration message, the switch fabric card that is optically interconnected to the worker line card records the fabric card information of the first switch fabric card and the fabric card identity of the first switch fabric card based on the second registration message, and then may further return a generated second registration acknowledgement response to the first switch fabric card through the optical interconnect path. The second registration response may carry fabric card information of switch fabric cards in the optical interconnect path at which the first switch fabric card is located.

In addition, the switch fabric card may update a locally recorded operating status of the line card in real time. For example, when the first switch fabric card receives a notification message whose message type is an operating status, the first switch fabric card updates the locally recorded operating status of the line card based on the notification message, and may further forward the notification message to the line card that is optically interconnected to the first switch fabric card. The first switch fabric card that participates in forwarding of the notification message may include a master switch fabric card and/or a slave switch fabric card. If the first switch fabric card is the worker switch fabric card described in the foregoing content that is optically interconnected to the line card, because the worker switch fabric card may include all switch fabric cards that are optically interconnected to the line card directly or indirectly on the optical interconnect path at which the line card is located, the optical interconnect path at which the line card is located may be a single-stage switching network, or may be a multi-stage switching network. In this case, when the notification message is sent to one (for example, the first switch fabric card) of the switch fabric cards, the switch fabric card not only forwards the notification message to a line card that is optically interconnected to the switch fabric card, but also forwards the notification message to a switch fabric card that is optically interconnected to the switch fabric card.

In actual application, for a reason such as a service requirement, a throughput or forwarding efficiency of the forwarding device may need to be increased, or a backup mechanism may need to be added to increase stability of the forwarding device, or the like. In all these cases, the forwarding device needs to be expanded by adding more line cards or switch fabric cards. Generally, an objective of capacity expansion can be achieved by deploying a new line card and/or a new switch fabric card. Alternatively, for a reason such as a service change, an existing optical interconnect path needs to be changed. In the present invention, mainly, the optical fiber is directly connected to the fabric interface chip in the line card, and the optical fiber is directly connected to the switch fabric chip in the switch fabric card. An additional optical cross-connect device may be added between the line card and the switch fabric card, or the line card and the switch fabric card may be connected directly by using the optical fiber. Therefore, architecture deployment mechanisms in the present invention can break through restrictions of the chassis, the cabinet, or the line card, thereby quickly completing deployment of a new line card or switch fabric card. The following describes implementation of capacity expansion and optical interconnect path changing in a mechanism A and a mechanism B provided in the present invention.

Mechanism A: A fabric interface chip in a line card and a switch fabric chip in a switch fabric card are connected by using an optical fiber.

1. During deployment of a new line card, a fabric interface chip in the line card may be optically interconnected to the switch fabric chip in the at least one switch fabric card by using the optical fiber, and then line card information of the line card is registered in the at least one switch fabric card that is optically interconnected to the fabric interface chip in the line card. Certainly, after the line card is successfully deployed, another switch fabric card may further be registered.

A mechanism for registering line card information of an accessed line card mainly includes line card identity (ID for short) pre-negotiation and dynamic line card ID allocation performed by the master switch fabric card.

(1) Line Card Identity Pre-Negotiation

Figures 2, 3:
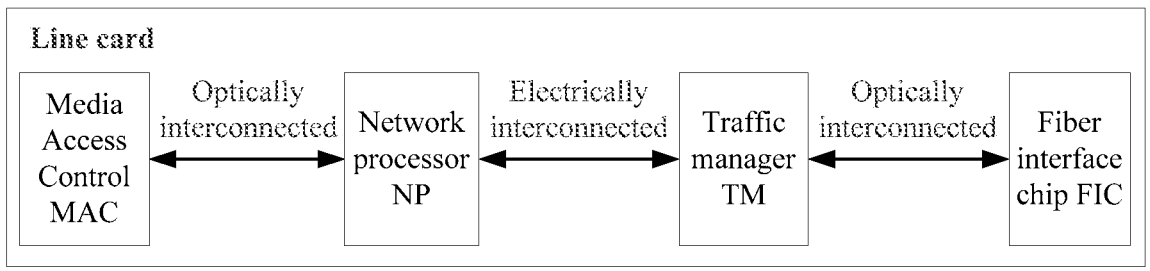

For example, an architecture shown in FIG. 3-1 includes a line card 3, a line card 4, a switch fabric card 1, a switch fabric card 2, and a switch fabric card 3. The line card 3 represents a line card whose line card ID is 3, and so on. The line card 4 is optically interconnected to the switch fabric card 1 and the switch fabric card 2. In addition, the switch fabric card 1 whose ID is the smallest may be defined as a master switch fabric card, and the switch fabric card 2 and the switch fabric card 3 may be defined as slave switch fabric cards. It should be noted that, for naming of the line card ID and the switch fabric card ID, a type field may be added to distinguish between the line card and the switch fabric card, thereby avoiding confusion between a line card whose ID is 2 and a switch fabric card whose ID is 2. In addition, with deployment of a large quantity of new line cards or switch fabric cards, line card IDs and switch fabric card IDs may be numbered according to a predefined rule. A specific manner is not limited in the present invention. Numbers of the line card ID and the switch fabric card ID have no upper limit, and may be infinitely numbered.

After the line card 4 obtains a line card ID allocated to the line card 4, the line card 4 may continue to perform a subsequent line card registration procedure. As shown in FIG. 3-2, the line card 4 sends a registration message to switch fabric cards (including the switch fabric card 1 and the switch fabric card 2) that are optically interconnected to the line card 4. The registration message includes fields such as a "message type", a "line card type", a "line card ID", a "capability parameter", and a "timestamp", where the message type is "registration", the line card type is a PTN line card, the line card ID is 4, the capability parameter is descriptions of an attribute and a capability of the PTN line card, and the timestamp carries current system time identifying when the PTN line card sends the registration message.

When receiving the registration message whose "message type" is "registration", each switch fabric card forwards the received registration message to another line card (for example, the line card 3 in FIG. 3-1) that is optically interconnected to the switch fabric card, and locally records content, the line card type, the line card ID, and the capability parameter in the registration message.

After receiving the foregoing registration message, the line card 3 generates a registration acknowledgement (ACK for short) message accordingly, returns the registration ACK message to the PTN line card whose ID is 4 through an original path, and locally records the content, the line card type, the line card ID, the attribute capability, and the like in the registration message. A format of the registration ACK message is shown in FIG. 3-3. It can be learned that, when generating a registration ACK message, each line card adds a line card ID, a line card type, and a capability parameter of the line card into the registration ACK message, and adds the line card ID of the line card 4 and the timestamp carried in the registration message into the registration ACK message. After generating a corresponding registration ACK message, each line card returns the registration ACK message to the line card 4 through an original path of receiving the registration message. Details are not described. In FIG. 3-3, a message type is a registration ACK message, an existing line card type is a line card type of the line card 3, an existing line card ID is an ID of the line card 3, a new line card ID is the ID of the line card 4, a timestamp is the timestamp carried in the registration message, and an existing line card attribute capability is the capability parameter of the line card 3.

The switch fabric card receives the registration ACK message sent by the line card 3, and sends the registration ACK message to the line card 4 according to the new line card ID field in the registration ACK message.

After receiving the registration ACK message, the line card 4 locally records the existing line card type, the existing line card ID, and the existing line card attribute capability in the registration ACK message, then subtracts the timestamp carried in the registration ACK message from current system time to obtain a round-trip transmission delay of forwarding from the line card 4 to the line card 3 by using the switch fabric card, and stores the round-trip transmission delay, so that when sending a data packet to the switch fabric card subsequently, the line card 4 delays sending a data packet that needs to be delayed.

(2) Dynamic Line Card Identity Allocation by the Master Switch Fabric Card

Figures 1, 2, 3:
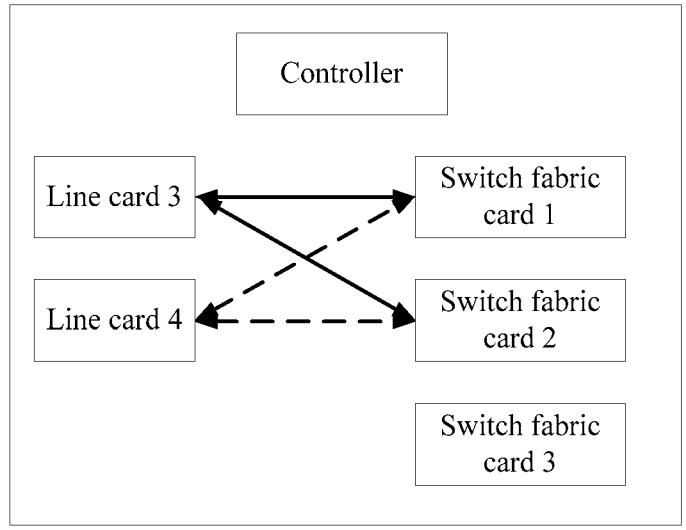
Figures 3, 4:
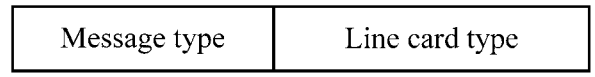

The architecture shown in FIG. 3-1 is used as an example. After being optically interconnected to the switch fabric card 1 and the switch fabric card 2, a new line card sends a request message for ID application to the switch fabric card 1 and the switch fabric card 2. The request message includes a "message type" and a "line card type", where the "message type" is "ID application". A structure of the request message is shown in FIG. 3-4.

After receiving the request message for ID application, a slave switch fabric card (for example, the slave switch fabric card 2 in FIG. 3-1) performs no operation, and may directly discard the request message.

Figures 3, 4, 5:
Figures 3, 4, 5, 6:
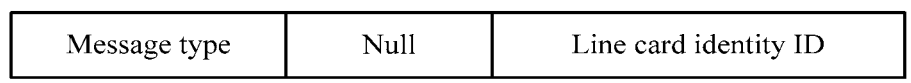

When receiving the request message for ID application, the master switch fabric card allocates an ID 4 to the new line card. The ID 4 is not the same as a fabric card ID of another switch fabric card or a line card ID of another line card. Then the master switch fabric card returns an ID grant message that carries the ID of the new line card to the new line card. A structure of the ID grant message is shown in FIG. 3-5. The line card ID is a line card ID granted to the new line card by the master switch fabric card. After receiving the ID grant message, the new line card records the line card ID of the new line card, and records fabric card information of the master switch fabric card at the same time. A subsequent registration procedure of the new line card is the same as the registration procedure for the line card ID pre-negotiation in the foregoing content. Details are not described herein again.

In addition, the line card ID may alternatively be allocated by a software defined networking (SDN for short) controller. Preferably, in this application, a principal switch is selected to allocate the line card ID.

In addition, in the foregoing two registration mechanisms, after the line card information of the line card is successfully registered in the switch fabric card, each switch fabric card that is optically interconnected to the line card monitors, in real time, a line card that is optically interconnected to the switch fabric card. If the switch fabric card 1 detects, based on an actual interface connection status, that the line card 1 is disconnected, the switch fabric card 1 deletes locally stored line card information of the line card 1. If the switch fabric card 1 is the master switch fabric card, the switch fabric card 1 further needs to notify all other line cards that are optically interconnected to the switch fabric card 1 that the line card 1 is disconnected, and identify the line card ID of the line card 1 in a notification message. A structure of the notification message is shown in FIG. 3-6.

2. During deployment of a first switch fabric card, a switch fabric chip in the first switch fabric card may be optically interconnected to a fabric interface chip in each line card in the forwarding device by using the optical fiber, and the first switch fabric card is registered in a line card that is optically interconnected to the first switch fabric card.

After the first switch fabric card is successfully deployed, another line card may further be registered.

With the architecture deployment mechanism A in the present invention, after an architecture of the forwarding device has been deployed, a new line card or a new switch fabric card can be flexibly deployed at any time, or an existing optical interconnect path can be flexibly changed, and an optical interface mapping relationship does not need to be configured. Therefore, compared with an existing mechanism, a mechanism in the present invention can break through restrictions of the chassis and geography, and can increase the throughput of the forwarding device without changing an original architecture.

For example, a process of changing an optical interconnect path between a line card and a switch fabric card by changing deployment of the architecture is specifically: changing an optical interconnect path between a fabric interface chip in the line card and a switch fabric chip in the switch fabric card. For example, the line card 1 is optically interconnected to the switch fabric card 1, the line card 2 is optically interconnected to the switch fabric card 2 and the switch fabric card 3, and a connection interface of an optical fiber may be changed in a hot swapping manner. If the optical fiber is removed from an end of the line card 1 and is connected to the line card 2, line card information of the line card 2 needs to be registered in the changed switch fabric card 1 that is optically interconnected to the line card 2. If the optical fiber is removed from an end of the switch fabric card 1 and is connected to the switch fabric card 2, fabric card information of the switch fabric card 2 needs to be registered in the line card 1. If the optical fiber is removed from an end of the line card 2, the switch fabric card 2 and the switch fabric card 3 delete locally stored line card information of the line card 2. Other examples are similar thereto and are not described in detail.

It can be learned from the mechanism A that, for example, as shown in FIG. 3-7, the line card 1 is optically interconnected to the switch fabric card 1 and the switch fabric card 2. If the line card 1 is optically interconnected to the switch fabric card 3 currently, the line card information of the line card 1 needs to be further registered in the switch fabric card 3, and this does not affect path transmission from the line card 1 to the switch fabric card 1 and the switch fabric card 2. Alternatively, if an optical interconnect path between the line card 1 and the switch fabric card 2 is cut off, path transmission from the line card 1 to the switch fabric card 1 is not affected, either.

After the new first switch fabric card is accessed, the first switch fabric card further needs to be registered, and a fabric card ID may be pre-negotiated or may not be pre-negotiated in a registration process. If the fabric card ID is not pre-negotiated, after the first switch fabric card is connected to an optical fiber, a line card that is optically interconnected to the first switch fabric card needs to be selected, and a request message for ID application is sent to the selected line card. A format of the request message is the same as that in FIG. 3-2. After receiving the request message, the line card forwards the request message to a master switch fabric card corresponding to the line card. After receiving the request message for ID application, the master switch fabric card allocates the fabric card ID to the first switch fabric card, generates an ID grant message carrying the fabric card ID of the first switch fabric card, and returns the ID grant message to the new switch fabric card through an original optical interconnect path.

After receiving the ID grant message, the first switch fabric card records the fabric card ID allocated to the first switch fabric card, and sends a switch fabric card registration message to all line cards that are optically interconnected to the first switch fabric card. After recording the fabric card information of the first switch fabric card, each line card that is optically interconnected to the first switch fabric card forwards the switch fabric card registration message to all other switch fabric cards. After receiving the switch fabric card registration message, the other switch fabric cards also locally record the fabric card information of the first switch fabric card. A recording manner may be shown in FIG. 3-8.

In addition, after fabric card information of a switch fabric card is successfully registered in a line card, each line card that is optically interconnected to the switch fabric card monitors, in real time, a switch fabric card that is optically interconnected to the line card, and the line card may detect, based on an actual interface connection status, whether the line card is disconnected from the switch fabric card. In an actual operating process of the forwarding device, the switch fabric card that is optically interconnected to the line card may be disconnected because of a factor such as network latency, weather, the optical fiber being unplugged by a person, or the optical fiber being damaged.

For example, if the line card 1 detects, based on an actual interface connection status, that the switch fabric card 1 is disconnected, the line card 1 deletes locally stored fabric card information of the switch fabric card 1, then notifies all other switch fabric cards that are optically interconnected to the line card 1 that the switch fabric card 1 is disconnected, and identifies a fabric card ID of the switch fabric card 1 in a notification message. A structure of the notification message is shown in FIG. 3-9. If the switch fabric card 1 is the master switch fabric card, the line card 1 further needs to reselect, based on the fabric card ID, a switch fabric card whose ID is the largest or smallest as the master switch fabric card. Certainly, after receiving the notification message indicating that "the switch fabric card 1 is disconnected", another switch fabric card determines, based on the fabric card ID of the disconnected switch fabric card 1 that is carried in the notification message, whether the switch fabric card 1 is the master switch fabric card, and if the switch fabric card 1 is the master switch fabric card, reselects, based on the fabric card ID, a switch fabric card whose ID is the largest or smallest as the master switch fabric card.

Mechanism B: A fabric interface chip in a line card and a switch fabric chip in a switch fabric card are connected by using an optical cross-connect device and an optical fiber.

An optical cross-connect device may be introduced into the forwarding device. During deployment of an architecture of the forwarding device, the fabric interface chip in the line card may be first optically interconnected to the optical cross-connect device by using the optical fiber, then the optical cross-connect device is optically interconnected to the switch fabric chip in the at least one switch fabric card by using the optical fiber, and finally, an optical interface mapping relationship between the line card and the at least one switch fabric card is configured in the optical cross-connect device. The optical interface mapping relationship includes a mapping relationship between a port of the line card and an interface of the optical cross-connect device and a mapping relationship between an interface of the optical cross-connect device and a port of the switch fabric card. Similar parts are not described in detail.

The optical cross-connect device includes a control interface and at least two data interfaces. The data interfaces include a plurality of uplink interfaces and a plurality of downlink interfaces corresponding to the plurality of uplink interfaces. The forwarding device further includes a controller, and the controller is communicatively connected to a first data interface and the control interface of the optical cross-connect device. The controller may be a device independent of the line card, the switch fabric card, and the optical cross-connect device, or may be a functional unit in the switch fabric card. The controller is configured to configure each optical interface mapping relationship in the forwarding device, and manage execution logic of the line card, the switch fabric card, and the optical cross-connect device.

When the fabric interface chip in the line card is optically interconnected to a second data interface of the optical cross-connect device, the optical cross-connect device forwards, to the controller by using the first data interface that is mapped to the second data interface and connected to the controller, a first request message that is sent by the line card, where the first request message is used to request to register the line card information of the new line card and configure a first optical interface mapping relationship; and then receives, by using the control interface connected to the controller, various types of control information delivered by the controller, for example, the first optical interface mapping relationship.

When the switch fabric chip in the first switch fabric card is optically interconnected to a third data interface of the optical cross-connect device, the optical cross-connect device forwards, to the controller by using the first data interface that is mapped to the third data interface, a second request message that is sent by the first switch fabric card, where the second request message is used to request to register the fabric card information of the first switch fabric card and configure a second optical interface mapping relationship.

In addition, after the optical cross-connect device registers the line card information of the line card in the controller by using the first data interface, the controller configures the corresponding first optical interface mapping relationship based on a line card type and a line card identity of the line card, and then delivers the first optical interface mapping relationship to the optical cross-connect device by using the control interface, to implement real-time control of the optical cross-connect device and management of the optical interconnect path.

After the optical cross-connect device receives, by using the control interface, the first optical interface mapping relationship delivered by the controller, the optical cross-connect device locally configures the optical interface mapping relationship. A procedure of registering the first switch fabric card is similar thereto and is not described in detail.

1. In a mechanism into which the optical cross-connect device is introduced, during deployment of the new line card, the fabric interface chip in the line card may be optically interconnected to the optical cross-connect device by using the optical fiber, and then a first optical interface mapping relationship between the line card and the at least one switch fabric card is configured in the optical cross-connect device. For the first optical interface mapping relationship, refer to the foregoing part. Details are not described again. The fabric interface chip in the line card is optically interconnected to the second data interface of the optical cross-connect device. For example, as shown in FIG. 4, an FIC chip of a line card is connected to a dynamic optical cross-connect device by using an optical fiber, an SW chip of a switch fabric card is connected to the dynamic optical cross-connect device by using an optical fiber, and then the optical cross-connect device is configured, thereby implementing optical interconnection between the FIC chip of the line card and the SW chip of the switch fabric card by using the optical cross-connect device.

A specific process of configuring the first optical interface mapping relationship is as follows:

The line card sends the first request message to the optical cross-connect device by using the first data interface; after receiving the first request message, the optical cross-connect device forwards the first request message to the controller by using the first data interface that is mapped to the second data interface, to register the line card information of the line card in the controller; then the controller configures the first optical interface mapping relationship based on the line card type and the line card identity of the line card, and delivers the first optical interface mapping relationship to the optical cross-connect device by using the control interface that is connected to the controller; and the optical cross-connect device locally configures the first optical interface mapping relationship.

For example, as shown in FIG. 5, a forwarding device currently includes a line card 1 and a switch fabric card 1, and an optical interface mapping relationship in an optical cross-connect device is that an interface 1 is mapped to an interface 5 and an interface 2 is mapped to an interface 6. In addition, the optical interface mapping relationship may include the following: An interface 14 is mapped to an interface 3. Currently, no optical fiber is connected to the interface 3, and the interface 14 is a data interface connected to the controller. An interface 13 is a control interface, and the control interface is connected to the controller. A new line card 2 is connected to the interface 3 of the optical cross-connect device by using an optical fiber, and the new line card 2 sends a request message for line card ID application to the optical cross-connect device by using the interface 3, and then sends the request message to the controller by using the interface 14. After obtaining a line card ID allocated by the controller, the new line card 2 sends a registration message by using the interface 3, and then sends the registration message to the controller by using the interface 14. After obtaining a line card type based on the registration message, the controller changes a configuration for the optical interface mapping relationship in the optical cross-connect device: The interface 3 is mapped to an interface 7, and an interface 4 is mapped to an interface 8. Then the controller delivers the optical interface mapping relationship to the optical cross-connect device by using the interface 13. In addition, the interface 14 may be mapped to another idle interface 9, so that when a switch fabric card is connected to the interface 9 subsequently, fabric card registration can be implemented by using the interface 9 and the interface 14.

A new switch fabric card 2 is connected to the interface 9 by using an optical fiber, and then the switch fabric card 2 sends a message by using the interface 9, and sends the message to the controller by using the interface 14. Then the controller configures a new optical interface mapping relationship, and the controller delivers the new optical interface mapping relationship to the optical cross-connect device by using the interface 13. If the optical cross-connect device still has an idle interface, the idle interface may be further mapped to the interface 14.

It can be learned that, during deployment of a new line card, only an optical interface mapping relationship configured in the optical cross-connect device needs to be updated, and an existing optical fiber connection does not need to be changed. For example, according to an architecture shown in FIG. 5, an initial optical interface mapping relationship is shown in the following Table 1.

TABLE 1

|   | 5 | 6 | 7 | 8 | 9 | 10 | 11 | 12 |
|---|---|---|---|---|---|----|----|----|
| 1 | ✓ |   |   |   |   |    |    |    |
| 2 |   | ✓ |   |   |   |    |    |    |
| 3 |   |   |   |   |   |    |    |    |
| 4 |   |   |   |   |   |    |    |    |

It can be learned from Table 1 that, an initial status of the forwarding device is: There are one line card and one switch fabric card, the line card is connected to the interface 1 and the interface 2 of the optical cross-connect device by using two optical fibers, four optical fibers of the switch fabric card are connected to the interfaces 5 to 8 of the optical cross-connect device, and a configuration for the optical interface mapping relationship of the optical cross-connect device is as follows: The interface 1 corresponds to the interface 5, and the interface 2 corresponds to the interface 6.

If a new line card is added, for example, the new line card is connected to the interface 3 and the interface 4 of the optical cross-connect device by using two optical fibers, a configuration for a latest optical interface mapping relationship of the optical cross-connect device needs to be added accordingly, that is, the interface 3 corresponds to the interface 7, and the interface 4 corresponds to the interface 8. After the optical cross-connect device receives, by using the interface 13, the newly added optical interface mapping relationship that is delivered by the controller, the optical cross-connect device updates a local optical interface mapping relationship. After a configuration for the optical interface mapping relationship is updated, the latest optical interface mapping relationship in the optical cross-connect device is shown in the following Table 2.

TABLE 2

|   | 5 | 6 | 7 | 8 | 9 | 10 | 11 | 12 |
|---|---|---|---|---|---|----|----|----|
| 1 | ✓ |   |   |   |   |    |    |    |
| 2 |   | ✓ |   |   |   |    |    |    |
| 3 |   |   | ✓ |   |   |    |    |    |
| 4 |   |   |   | ✓ |   |    |    |    |

2. During deployment of the first switch fabric card, the optical cross-connect device may be optically interconnected to the switch fabric chip of the first switch fabric card by using the optical fiber, and then an optical interface mapping relationship between each line card and the new switch fabric card may be configured in the optical cross-connect device.

Certainly, in the mechanism B, if a transmission path needs to be changed subsequently, an optical interface mapping relationship between a line card and each switch fabric card in the forwarding device may be changed in the optical cross-connect device, to change an optical interconnect path between the line card and the switch fabric card. It can be learned that, compared with an existing mechanism, an architecture deployed according to the mechanism B can be expanded at any time after an architecture of the forwarding device has been deployed, and neither a deployment position nor a deployment quantity of boards (line cards or switch fabric cards) is limited. The present invention can break through restrictions of a chassis and geography, and increase a throughput without changing an original architecture. In addition, deployment is flexible, and problems such as relatively low integration, relatively poor heat dissipation, a high demand for power, and a large occupied area that are caused when the board is restricted to the chassis or cabinet can be avoided to some extent.

For example, the line card and the switch fabric card are deployed according to the architecture shown in FIG. 5. After a new line card is added, the optical interface mapping relationship shown in Table 2 is obtained. On the basis of Table 2, if a new switch fabric card is further added, and four optical fibers of the new switch fabric card are connected to interfaces 9 to 12 of the dynamic optical cross-connect device, the optical interface mapping relationship configured in the optical cross-connect device needs to be updated to the following: The interface 1 corresponds to the interface 5, the interface 2 corresponds to the interface 9, the interface 3 corresponds to the interface 6, and the interface 4 corresponds to an interface 10. An updated optical interface mapping relationship is shown in the following Table 3.

TABLE 3

|   | 5 | 6 | 7 | 8 | 9 | 10 | 11 | 12 |
|---|---|---|---|---|---|----|----|----|
| 1 | ✓ |   |   |   |   |    |    |    |
| 2 |   |   |   |   |   | ✓  |    |    |
| 3 |   | ✓ |   |   |   |    |    |    |
| 4 |   |   |   |   |   | ✓  |    |    |

In the mechanism B, after the line card and the first switch fabric card are newly added, and an optical interface mapping relationship between each line card in the forwarding device and each switch fabric card is updated, the controller further needs to map the idle third data interface of the optical cross-connect device to the first data interface, so that when the new line card is connected to the third data interface, the line card information may be registered in the controller by using the first data interface, and an optical interface mapping relationship may be configured; or an idle fourth data interface of the optical cross-connect device is mapped to the first data interface, so that when the new switch fabric card is connected to the fourth data interface, the fabric card information may be registered in the controller by using the first data interface, and an optical interface mapping relationship may be configured.

Certainly, a multi-stage switching network may further be configured. For example, in a multi-stage switching network shown in FIG. 6, a same capacity expansion mechanism is used between a first-stage switch fabric card and a second-stage switch fabric card, and one optical cross-connect device is provided in each stage of switching network. For configuration of each stage of switching network, refer to configuration of another stage of switching network. Details are not described.

In addition, an optical interface mapping relationship between a destination line card and each switch fabric card in the forwarding device may be changed in the optical cross-connect device, so as to change an optical interconnect path between the destination line card and the switch fabric card, where the destination line card is the line card and/or the new line card. It can be learned that, with the optical cross-connect device, an existing optical fiber connection does not need to be changed, and only a locally configured optical interface mapping relationship needs to be changed, so as to achieve an objective of changing the optical interconnect path between the line card and the switch fabric card. This is efficient to operate, and further, there is no need to plug and unplug the optical fiber at a position of the line card or switch fabric card. Therefore, manual labor is saved.

In an actual application scenario, when the fabric interface chip in the line card is optically interconnected to the switch fabric chip in the at least one switch fabric card by using the optical fiber, because a length of an optical fiber causes a transmission delay (there is a 500-nanosecond transmission delay approximately every 100 meters of the optical fiber), and lengths of optical fibers used for connecting a same line card to the switch fabric cards may be different, transmission delays from the same line card to different switch fabric cards may be different. Consequently, an out-of-order status is relatively severe when load of a plurality of packets of a same stream or a plurality of cells of a same packet is shared with a downlink destination end through different paths. To ensure data accuracy, resequencing is required, and a resequencing cache finally increases because of the transmission delay, causing relatively heavy load of the forwarding device. To reduce the resequencing cache, a delay mechanism may be predefined, so that a transmit end can perform, based on a transmission delay of a path, delay processing on data that is to be transmitted on the path, thereby reducing a difference between a delay of reaching the destination end and a delay of reaching another path, reducing an out-of-order degree, and further reducing the resequencing cache. A specific process is as follows:

After the optical interconnect path from the line card to the switch fabric card has been deployed, the line card may calculate a path delay from the line card to the destination line card, where the path delay from the line card to the destination line card includes a path delay from the line card to a destination switch fabric card and a path delay from the destination switch fabric card to the destination line card, and the destination switch fabric card is a switch fabric card that forwards a data packet currently sent by the line card and that is in the at least one switch fabric card optically interconnected to the line card.

After calculating each path delay, the line card performs, based on the calculated path delay, delay processing on a data packet that requires delay processing, and then sends the data packet to the destination line card.

It should be noted that, a path delay can be calculated for a single-stage switching network and a multi-stage switching network. For example, a line card is optically interconnected to at least two switch fabric cards to form a plurality of paths, and a delay of each path needs to be calculated. For another example, the line card is optically interconnected to a switch fabric card 1, the switch fabric card 1 may be further optically interconnected to at least two switch fabric cards, and finally the line card is optically interconnected to the destination line card. Because load sharing is performed after the switch fabric card 1, a plurality of paths are also formed: the line card→the switch fabric card 1→the switch fabric cards optically interconnected to the switch fabric card 1→the destination line card. In this case, a delay of each path also needs to be calculated.

For example, as shown in FIG. 5-1, a transmit end of a router line card is optically interconnected to a switch fabric card 1 and a switch fabric card 2, and a destination end of the router line card is optically interconnected to the switch fabric card 1 and the switch fabric card 2, to form two transmission paths. A path 1 is the transmit end→the switch fabric card 1→the destination end, and a path 2 is the transmit end→the switch fabric card 2→the destination end. When sending data to the destination end, the transmit end sends data to the destination end through load sharing of the path 1 and the path 2. Because lengths of optical fibers on the path 1 and the path 2 have a relatively large difference, when the transmit end sends the data to the destination end through the two paths, there is a relatively large difference between time at which data transmitted through the path 1 and the path 2 reaches the destination end. A transmission delay of the path 1 and a transmission delay of the path 2, which are 1 microsecond and 10 microseconds respectively, have already been calculated when the router line card is deployed. Therefore, data shared to the path 1 may pass through a delay module to be delayed 9 microseconds before being sent, and data shared to the path 2 may be delayed 0 microseconds or may not pass through the delay module. Finally, time at which data transmitted through the path 1 and the path 2 reaches the destination end is basically the same. For a specific delay functional structure in the forwarding device, refer to FIG. 5-2, and a specific structure is not limited to FIG. 5-2.

Specifically, there are mainly the following two methods for calculating the path delay from the line card to the destination line card.

Method 1: The line card sends a measurement packet to the destination line card through a designated path, where the measurement packet carries a current system timestamp identifying when the line card sends the measurement packet; and then the destination line card returns the measurement packet to the line card through the designated path, where the designated path includes a path from the line card to a destination switch fabric card and a path from the destination switch fabric card to the destination line card.

After receiving the measurement packet returned by the destination line card, the line card can calculate a delay of the designated path based on current system time and a timestamp in the measurement packet.

Method 2: The line card calculates the path delay based on a propagation speed of an optical signal in an optical fiber, a length of an optical fiber from the line card to a destination switch fabric card, and a length of an optical fiber from the destination switch fabric card to the destination line card.

It should be noted that, in the foregoing method 1 and method 2, the line card can not only calculate a path delay of a single-stage switching network, but also calculate a path delay of a multi-stage switching network, where calculation manners of the path delay of the single-stage switching network and the path delay of the multi-stage switching network (a topological structure shown in FIG. 6) are the same.

Figures 3, 4, 5, 6, 7:
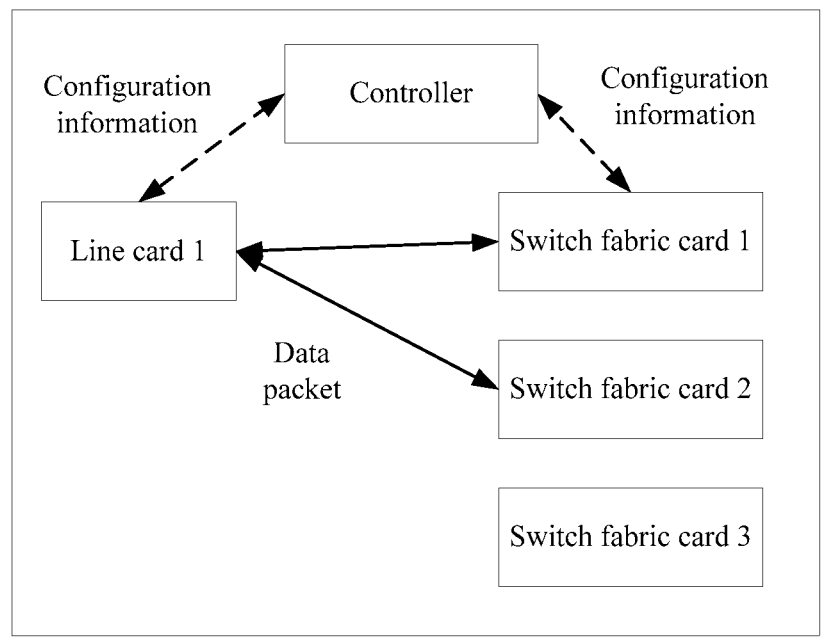

The following uses the multi-stage switching network as an example for delay compensation. As shown in FIG. 7, there are a plurality of paths from a line card 7 (a transmit end) to a line card 10 (a receive end). Each path may be denoted by using a path ID, or may be denoted by using node IDs of nodes on the path. In FIG. 7, switch fabric cards used as nodes corresponding to the path 1 are 1-5-3, switch fabric cards used as nodes corresponding to the path 2 are 2-6-4, and so on. After measurement, a transmission delay of the path 1 is 1 microsecond, and a transmission delay of the path 2 is 10 microseconds. In this case, when load sharing is performed for the path 1 and the path 2 for data sending, data on the path 1 needs to be delayed 9 microseconds before being sent.

In addition, in a scenario of the multi-stage switching network, a measurement process during registration of the line card 7 is as follows:

After going online and obtaining a line card ID through application, the new line card 7 sends a registration message to all switch fabric cards that are connected to the new line card 7, that is, the switch fabric cards 1 and 2. The registration message includes a timestamp and a line card ID 7, and a message type of the registration message is identified as "registration".

After receiving the registration message, the switch fabric card 1 adds a fabric card ID of the switch fabric card 1 (adds ID=1) into the registration message, then forwards a registration message 1 into which ID=1 is added to all other line cards that are connected to the switch fabric card 1, that is, a switch fabric card 8, and forwards the registration message 1 to all next-stage switch fabric cards that are connected to the switch fabric card 1, that is, switch fabric cards 5 and 6. A procedure after the switch fabric card 2 receives the registration message is similar to that for the switch fabric card 1, and details are not described again.

After receiving the registration message 1 sent by the switch fabric card 1, the switch fabric card 5 adds a fabric card ID of the switch fabric card 5 into the registration message 1, and then forwards a registration message 2 into which ID=5 is added to all other switch fabric cards that are connected to the switch fabric card 5, that is, switch fabric cards 2, 3, and 4. A procedure after the switch fabric card 6 receives the registration message 2 is similar to that for the switch fabric card 5, and details are not described again.

After receiving the registration message 2 sent by the switch fabric card 5, the switch fabric card 3 adds a fabric card ID of the switch fabric card 3 into the registration message 2, and then forwards a registration message 3 into which ID=3 is added to line cards 9 and 10 that are connected to the switch fabric card 3. Procedures after the switch fabric cards 2 and 4 receive the registration message are similar to that for the switch fabric card 3, and details are not described again.

After receiving the registration message 3, the line card 10 generates a registration ACK message, adds, into the registration ACK message, the timestamp carried in the registration message sent by the line card 7 and fabric card IDs added by the switch fabric cards (or an end-to-end path ID), and finally returns the registration ACK message to the line card 7 through a transmission path of the registration message.

After receiving the registration ACK message, the line card 7 may obtain corresponding path information from the registration ACK message, and then calculate a one-way delay of each path based on the path information.

The foregoing describes the board registration method in the present invention, and the following separately describes a line card and a switch fabric card that execute the foregoing board registration.

Figures 3, 4, 5, 6, 7, 8, 9:
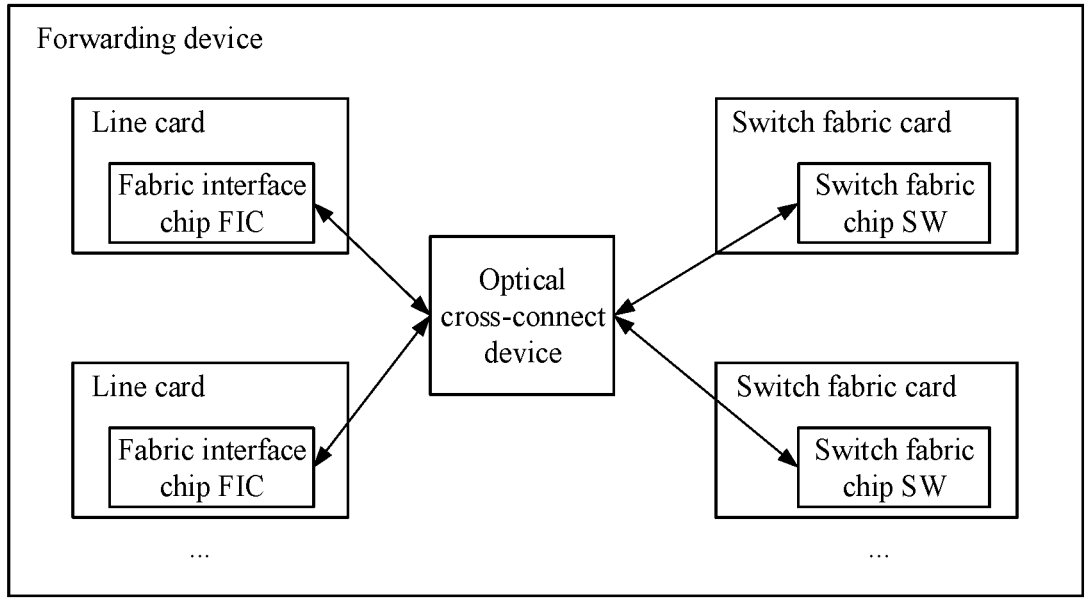
Figure 5:
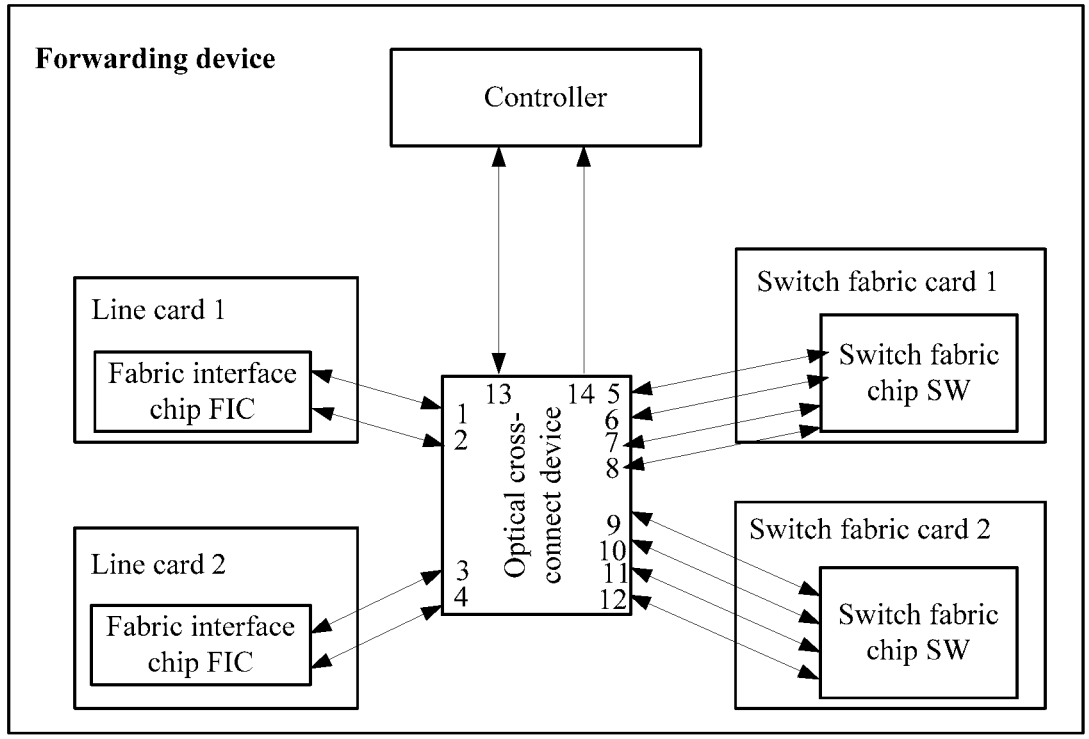
Figures 1, 5:
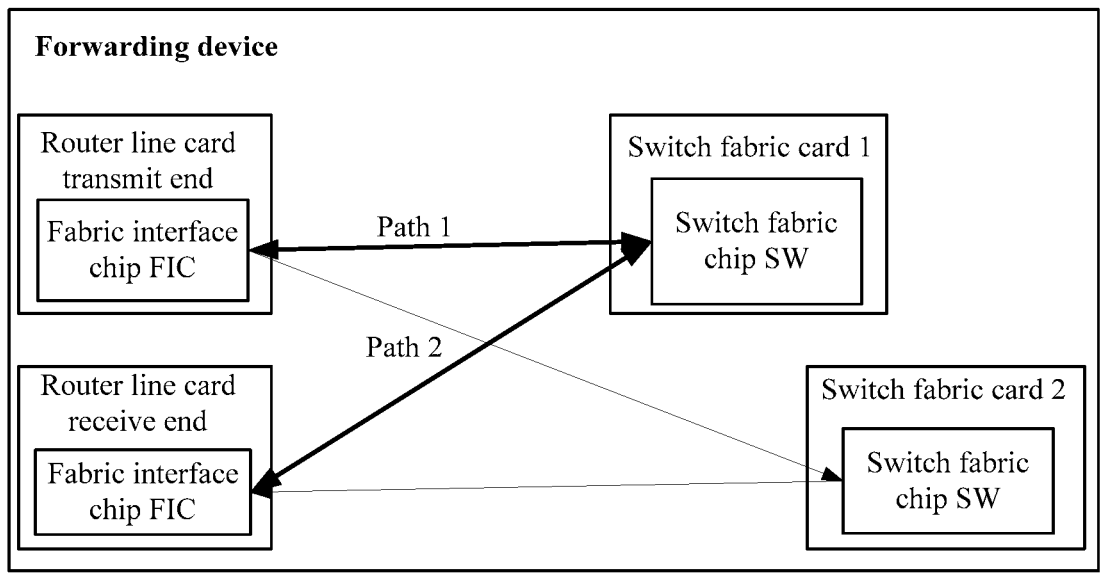
Figures 2, 5:
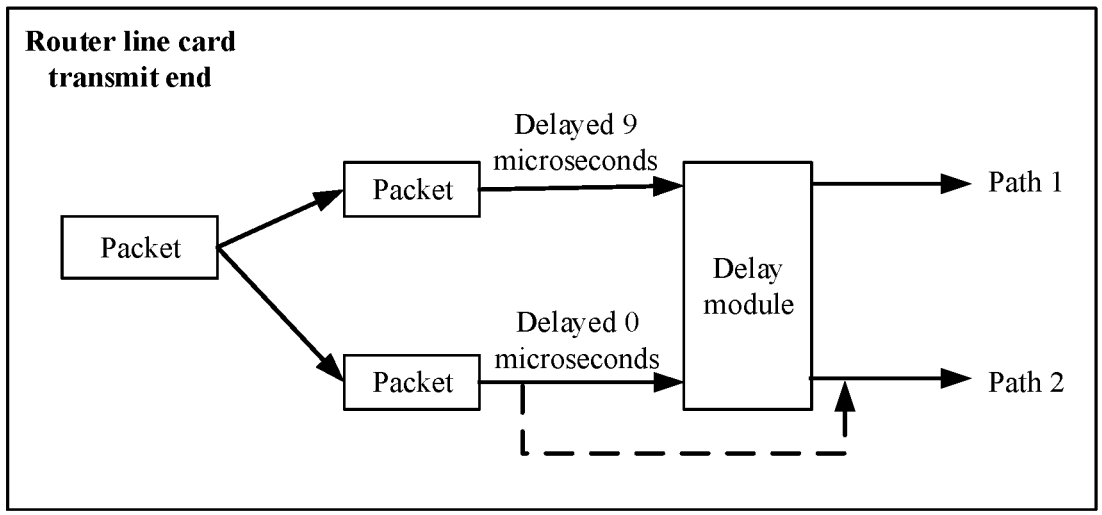
Figure 6:
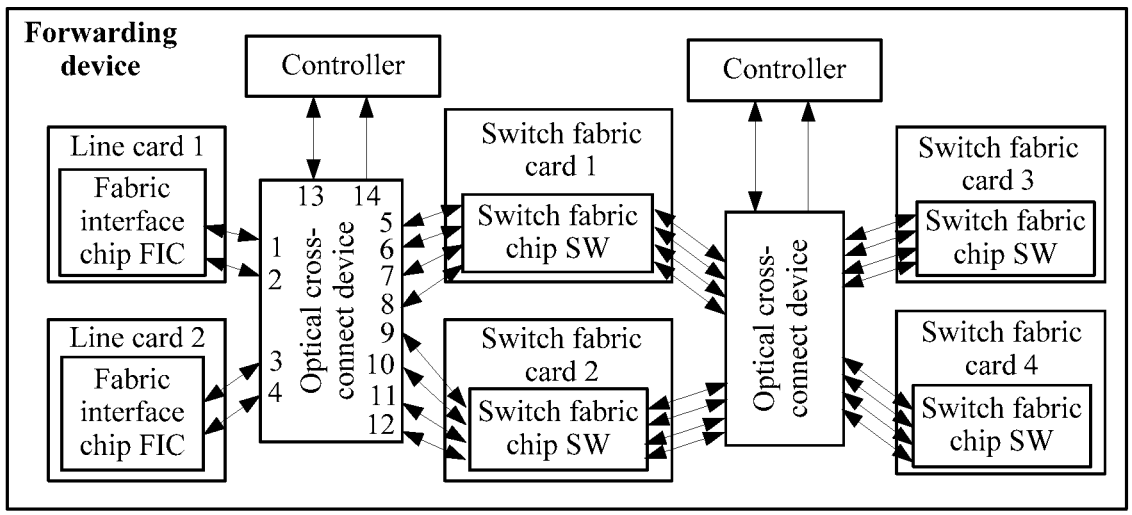
Figure 7:
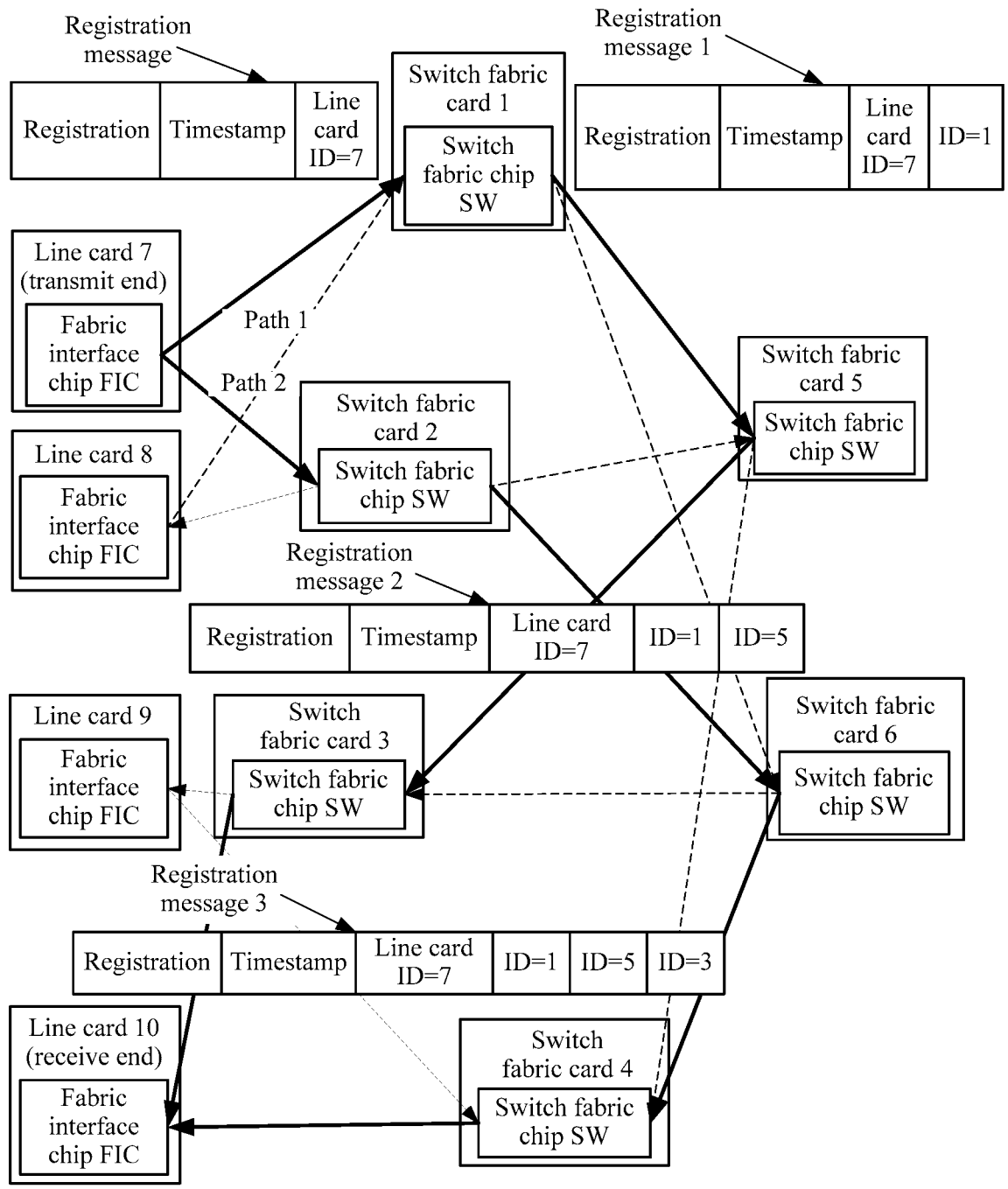
Figure 8:
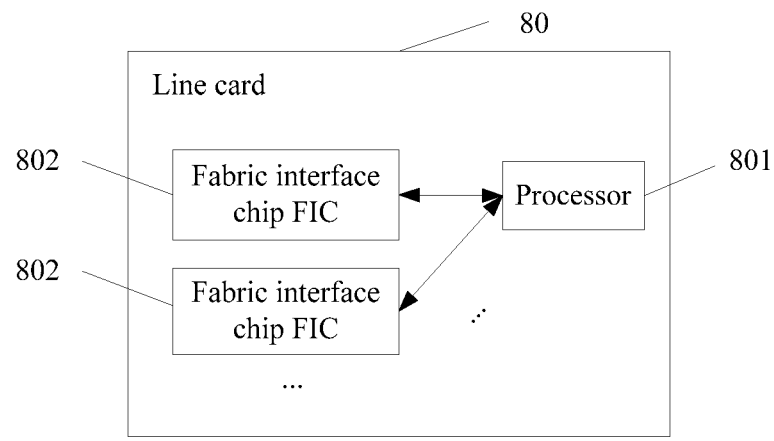
Figure 9:
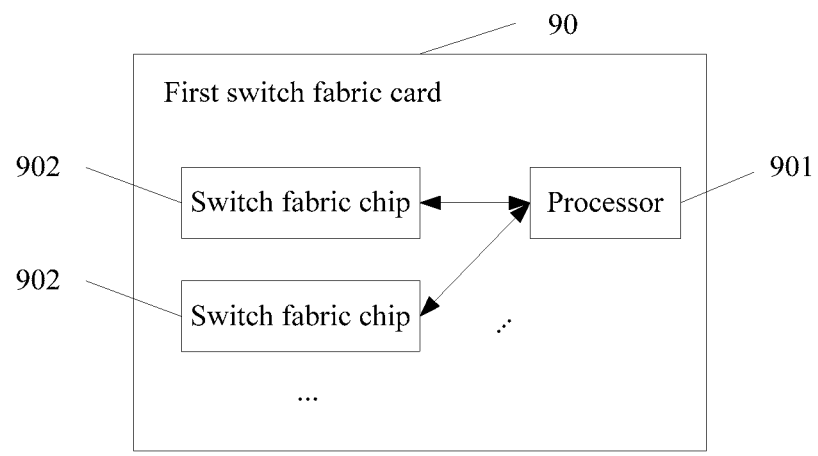

1. Referring to FIG. 8, a line card 80 is described. The line card 80 includes:

The line card 80 includes a processor 801 and a fabric interface chip 802, and the fabric interface chip 802 is optically interconnected to a switch fabric chip in at least one switch fabric card by using an optical fiber.

The fabric interface chip 802 is configured to: obtain line card information of the line card, and send the line card information to the at least one switch fabric card through an optical interconnect path, so that the at least one switch fabric card registers the line card 80 based on the line card information.

Before obtaining the line card information of the line card, the fabric interface chip 802 is further configured to obtain a line card identity of the line card through the optical interconnect path. If the at least one switch fabric card includes a master switch fabric card, the fabric interface chip 802 is specifically configured to: first send a first request message to the master switch fabric card through the optical interconnect path, where the first request message is used to request to obtain the line card identity of the line card; and then receive, through the optical interconnect path, a first request response that is returned by the master switch fabric card, where the first request response carries the line card identity that is allocated to the line card by the master switch fabric card based on the first request message.

In some possible designs, the fabric interface chip 802 is specifically configured to: after receiving the line card identity that is allocated by the master switch fabric card, send a first registration message to the worker switch fabric card that is optically interconnected to the line card, where the first registration message carries the line card information of the line card and the line card identity of the line card, so that the worker switch fabric card records the line card information of the line card and the line card identity of the line card based on the first registration message, where the worker switch fabric card is a switch fabric card in the at least one switch fabric card.

After sending the first registration message to the worker switch fabric card that is optically interconnected to the line card, the fabric interface chip 802 may further receive a first registration acknowledgement response sent by the worker switch fabric card, where the first registration acknowledgement response is generated by a line card that is optically interconnected to the worker switch fabric card, and the first registration acknowledgement response carries line card information of line cards in an optical interconnect path at which the line card is located.

The first registration message further carries a current system timestamp identifying when the line card sends the first registration message, and the first registration acknowledgement response carries the timestamp.

In some designs, the line card may further register a first switch fabric card.

Specifically, the fabric interface chip 802 receives a second registration message sent by the first switch fabric card that is optically interconnected to the line card, where the second registration message carries fabric card information of the first switch fabric card and a fabric card identity of the first switch fabric card; and then the processor 801 records the fabric card information of the first switch fabric card and the fabric card identity of the first switch fabric card based on the second registration message.

After the processor 801 records the fabric card information of the first switch fabric card and the fabric card identity of the first switch fabric card, the fabric interface chip may further forward the second registration message to a switch fabric card that is optically interconnected to the line card, so that the switch fabric card that is optically interconnected to the line card records the fabric card information of the first switch fabric card and the fabric card identity of the first switch fabric card.

In addition, after the line card forwards the second registration message to the switch fabric card that is optically interconnected to the line card, the fabric interface chip 802 may further receive a first registration response sent by the worker switch fabric card, where the first registration response is generated by the line card that is optically interconnected to the worker switch fabric card, and the second registration response carries the line card information of line cards in the optical interconnect path at which the line card is located.

To reduce a data sequencing problem caused by load sharing paths, after registration is complete, the processor may further calculate a path delay from the line card to a destination line card, and send a data packet to the destination line card based on the path delay. The path delay is calculated mainly in one of the following manners:

sending, by the fabric interface chip 802, a measurement packet to the destination line card through a designated path, and receiving, through the designated path, the measurement packet returned by the destination line card, where the measurement packet carries a current system timestamp identifying when the line card sends the measurement packet; and then calculating, by the processor 801, a delay of the designated path based on current system time and the timestamp, where the designated path includes a path from the line card to the destination switch fabric card and a path from the destination switch fabric card to the destination line card; or calculating, by the processor 801, the path delay based on a propagation speed of an optical signal in an optical fiber, a length of an optical fiber from the line card to a destination switch fabric card, and a length of an optical fiber from the destination switch fabric card to the destination line card.

In addition, when it is detected that the switch fabric card that is optically interconnected to the line card is disconnected, the processor 801 may further release a locally recorded fabric card identity that is allocated to the disconnected switch fabric card, to reduce redundant data, and a released fabric card identity can be recycled.

In some scenarios, an optical cross-connect device may further be introduced into a forwarding device. When the fabric interface chip 802 is optically interconnected to the optical cross-connect device, the fabric interface chip 802 sends the first registration message to the optical cross-connect device, so that the optical cross-connect device forwards the first registration message to a controller, where the first registration message is used to request to register the line card information of the first line card and configure a first optical interface mapping relationship, and the first optical interface mapping relationship is an optical interface mapping relationship between the first line card and the at least one switch fabric card.

2. Referring to FIG. 9, a first switch fabric card 90 is described. The first switch fabric card 90 includes a processor 901 and a switch fabric chip 902. The switch fabric chip 902 is optically interconnected to a fabric interface chip of at least one line card.

The switch fabric chip 902 is configured to receive, through an optical interconnect path, line card information of the line card sent by the line card.

The processor 901 is configured to register the line card based on the line card information.

Specifically, the switch fabric chip 902 receives a first registration message sent by a line card that is optically interconnected to the first switch fabric card 90, where the first registration message carries the line card information of the line card and a line card identity of the line card; and then the processor 901 records the line card information of the line card and the line card identity of the line card based on the first registration message.

After the first switch fabric card 90 records the line card information of the line card and the line card identity of the line card based on the first registration message, the processor 901 may further add a fabric card identity of the first switch fabric card 90 into the first registration message, and then the switch fabric chip 902 forwards the first registration message into which the fabric card identity of the first switch fabric card is added to the line card that is optically interconnected to the first switch fabric card, so that the line card that is optically interconnected to the first switch fabric card 90 records the line card information.

After the processor 901 forwards the first registration message into which the fabric card identity of the first switch fabric card 90 is added to the line card that is optically interconnected to the first switch fabric card 90, the switch fabric chip 902 is further configured to:

after receiving a first registration acknowledgement response, forward the first registration acknowledgement response to the line card, where the first registration acknowledgement response is generated by the line card that is optically interconnected to the first switch fabric card, and the first registration acknowledgement response carries line card information of line cards in an optical interconnect path at which the line card is located.

The first switch fabric card 90 can register the line card that is optically interconnected to the first switch fabric card, and after the first switch fabric card 90 goes online, the first switch fabric card 90 further needs to be registered by a line card. Specifically, the switch fabric chip 902 obtains fabric card information of the first switch fabric card, and sends the fabric card information of the first switch fabric card 90 to the at least one line card through an optical interconnect path, so that the at least one line card that receives the fabric card information registers the first switch fabric card based on the fabric card information.

Before obtaining the fabric card information of the first switch fabric card 90, the switch fabric chip 902 may be further configured to obtain the fabric card identity of the first switch fabric card through the optical interconnect path.

If the at least one second switch fabric card includes a master switch fabric card, the switch fabric chip is specifically configured to:

send a second request message to the master switch fabric card through the optical interconnect path, where the second request message is used to request to obtain the fabric card identity of the first switch fabric card 90; and receive a second request response through the optical interconnect path, where the second request response carries the fabric card identity that is allocated to the first switch fabric card 90 by the master switch fabric card based on the second request message.

A specific process of registration of the first switch fabric card 90 is: sending, by the switch fabric chip 902, a second registration message to a worker line card that is optically interconnected to the first switch fabric card 90, where the second registration message carries the fabric card information of the first switch fabric card 90 and the fabric card identity of the first switch fabric card 90, so that the worker line card records the fabric card information of the first switch fabric card 90 and the fabric card identity of the first switch fabric card 90, where the worker line card is a line card in the at least one line card.

After sending the second registration message to the worker line card that is optically interconnected to the first switch fabric card 90, the switch fabric chip 902 may be further configured to:

receive a second registration acknowledgement response sent by the worker line card, where the second registration acknowledgement response is generated by a switch fabric card that is optically interconnected to the worker line card, and the second registration response carries fabric card information of switch fabric cards in the optical interconnect path at which the first switch fabric card 90 is located.

In an actual use process of a forwarding device, a line card is probably disconnected because an optical fiber is accidentally unplugged, loosely contacted, or damaged. Therefore, the first switch fabric card 90 may further detect a connection status of each line card in an optical interconnect path in real time. When it is detected that a line card that is optically interconnected to the first switch fabric card 90 is disconnected, the processor 901 may further release a locally recorded line card identity allocated to the disconnected line card.

In some designs, when the first switch fabric card 90 receives a notification message whose message type is an operating status, the processor 901 updates a locally recorded operating status of the line card based on the notification message, and forwards, by using the switch fabric chip 902, the notification message to the line card that is optically interconnected to the first switch fabric card 90.

In some designs, if an optical cross-connect device is introduced into the forwarding device, when the switch fabric chip 902 is optically interconnected to the optical cross-connect device, the switch fabric chip 902 may be further configured to send the second registration message to the optical cross-connect device, so that the optical cross-connect device forwards the second registration message to a controller that is communicatively connected to the optical cross-connect device, where the second registration message is used to request to register the fabric card information of the first switch fabric card 90 and configure a second optical interface mapping relationship, and the second optical interface mapping relationship is an optical interface mapping relationship between the at least one line card and the first switch fabric card 90.

The present invention further provides a forwarding device 1. The forwarding device 1 includes at least one line card 11 and at least one switch fabric card 12, the line card 11 includes at least one fabric interface chip 111, and the switch fabric card 12 includes at least one switch fabric chip 121.

Each fabric interface chip 111 in the line card 11 may be optically interconnected to the switch fabric chip 121 in the at least one switch fabric card 12 by using an optical fiber, and the switch fabric card 12 is configured to: forward data sent by the line card 11, and forward, to the line card 11, data whose destination end is the line card 11.

The at least one line card 11 includes at least one of a router line card, a switch line card, an optical transport network OTN line card, a packet transport network PTN line card, or a programmable white box line card.

The line card 11 further includes at least one chip 112, and the fabric interface chip 111 is electrically and/or optically interconnected in series to the at least one chip 112. For a specific connection diagram, refer to FIG. 2-2 and FIG. 2-3.

Specifically, the fabric interface chip 111 includes at least one first silicon photonic chip 1111, and the switch fabric chip 121 in the switch fabric card includes at least one second silicon photonic chip 1211.

Figure 10:
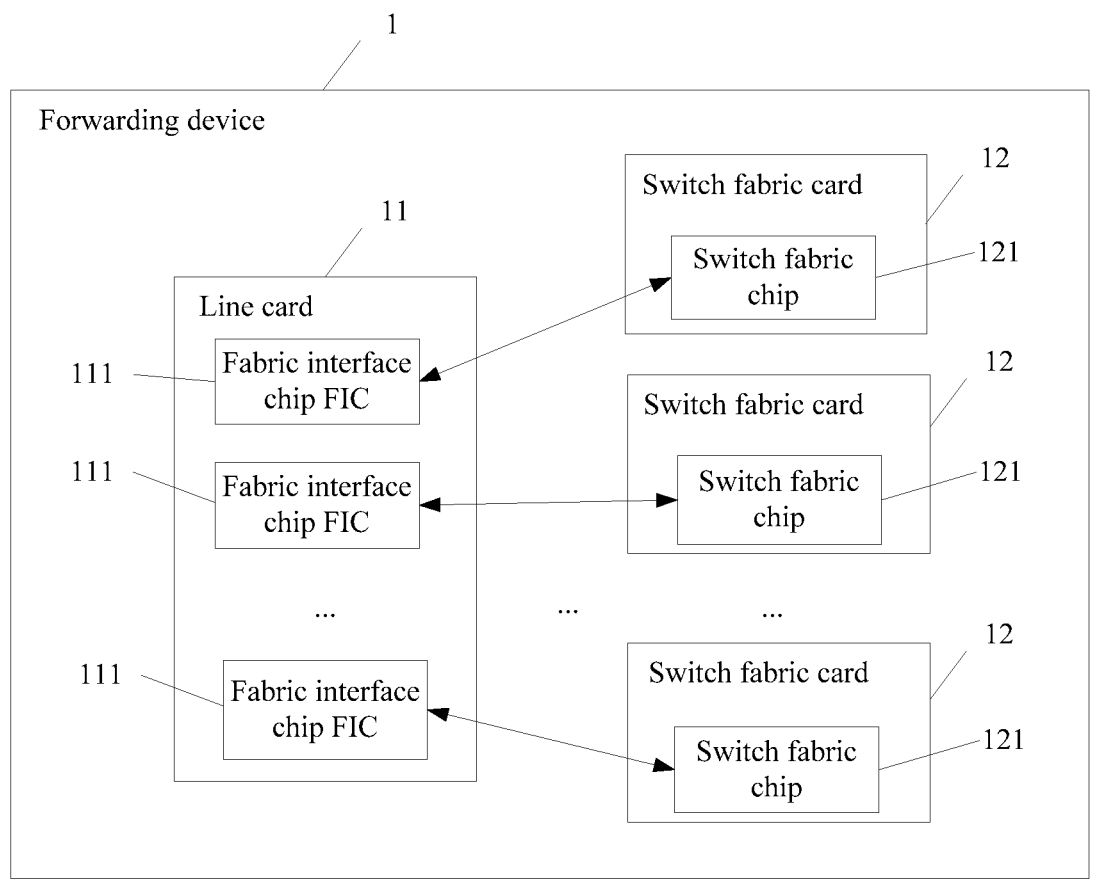
FIG. 10 is a schematic structural diagram of a forwarding device according to an embodiment.
Figures 1, 10:
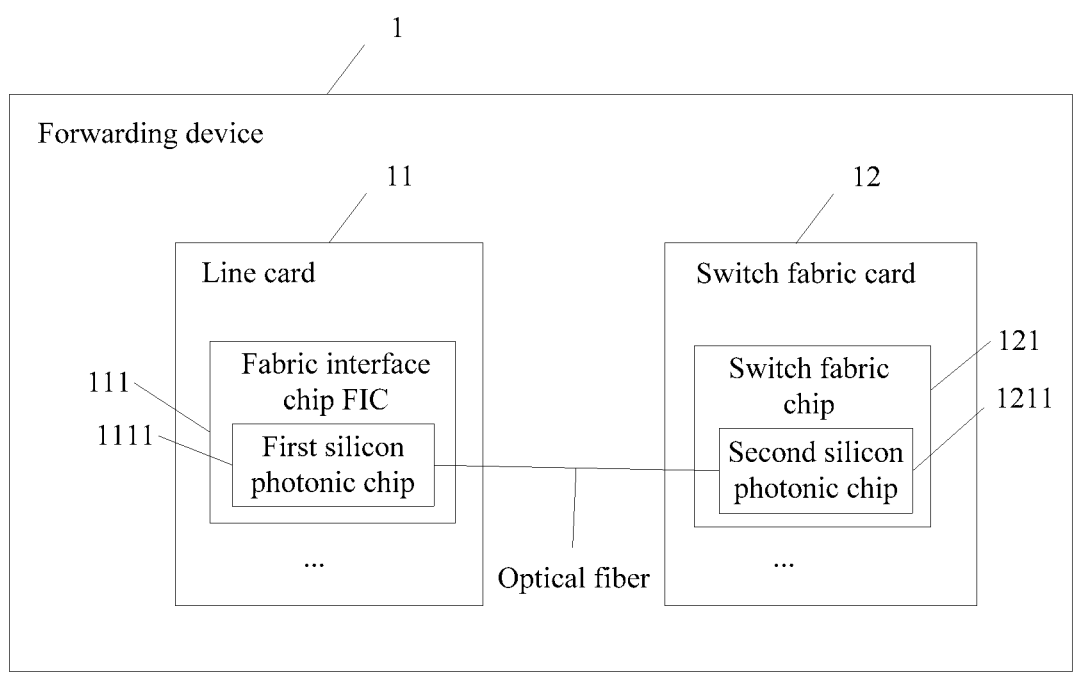

The first silicon photonic chip 1111 and the second silicon photonic chip 1211 are optically interconnected to each other by using an optical fiber. For a specific connection diagram, refer to FIG. 10-1.

If an optical cross-connect device is further introduced into the forwarding device 1, the fabric interface chip 111 in the line card 11 is optically interconnected to the optical cross-connect device by using an optical fiber, and the optical cross-connect device is optically interconnected to the switch fabric chip 121 in the at least one switch fabric card 12 by using an optical fiber. For a specific connection diagram, refer to FIG. 4.

Compared with an existing mechanism, during deployment of a line card and/or a switch fabric card managed by the forwarding device, a mechanism in the present invention requires neither a chassis nor a cabinet and is not restricted by a deployment position, so that remote distributed deployment can be implemented, and deployment efficiency can be increased. In addition, deployment of a new line card and/or a new switch fabric card does not affect an existing optical interconnect path.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation.

For example, a plurality of modules or components may be combined or may be integrated into another system, or some features may be ignored or not performed. In addition, the displayed or discussed mutual couplings or direct couplings or communicative connections may be implemented by using some interfaces. The indirect couplings or communication connections between the apparatuses or modules may be implemented in electrical, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM for short), a random access memory (RAM for short), a magnetic disk, or an optical disc.

The technical solutions provided in the embodiments of the present invention are described in detail above. The principle and implementation of the present invention are described herein by using specific examples in this specification. The description about the embodiments is merely provided to help understand the method and core ideas of the present invention. In addition, a person of ordinary skill in the art can make variations and modifications to the present invention in terms of the specific implementations and application scopes according to the ideas of the present invention. In conclusion, the content of this specification shall not be construed as a limitation on the present invention.

What is claimed is:

1. A line card registration method, applied to a line card, wherein the line card comprises a fabric interface chip, wherein the fabric interface chip is optically interconnected to a switch fabric chip in at least one switch fabric card by using an optical fiber, and wherein the method comprises:
    sending, by the line card, a first request message to a master switch fabric card through an optical interconnect path, wherein the first request message is used to request to obtain a line card identity of the line card;
    receiving, by the line card, a first request response through the optical interconnect path, wherein the first request response carries the line card identity that is allocated to the line card by the master switch fabric card based on the first request message;
    obtaining, by the line card, line card information of the line card; and
    sending, by the line card, the line card information to the at least one switch fabric card through the optical interconnect path, wherein the at least one switch fabric card registers the line card based on the line card information.

2. The method according to claim 1, wherein the sending the line card information to the at least one switch fabric card through an optical interconnect path comprises:
    after the line card receives the line card identity that is allocated by the master switch fabric card, sending, by the line card, a first registration message to a worker switch fabric card that is optically interconnected to the line card, wherein the first registration message carries the line card information of the line card and the line card identity of the line card, wherein the worker switch fabric card records the line card information of the line card and the line card identity of the line card based on the first registration message, and wherein the worker switch fabric card is a switch fabric card in the at least one switch fabric card.

3. The method according to claim 2, wherein after the sending, by the line card, a first registration message to a worker switch fabric card that is optically interconnected to the line card, the method further comprises:
    receiving, by the line card, a first registration acknowledgement response sent by the worker switch fabric card, wherein the first registration acknowledgement response is generated by a line card that is optically interconnected to the worker switch fabric card, and wherein the first registration acknowledgement response carries line card information of line cards in an optical interconnect path at which the line card is located.

4. The method according to claim 3, wherein the first registration message further carries a current system timestamp identifying when the line card sends the first registration message, and wherein the first registration acknowledgement response carries the timestamp.

5. The method according to claim 1, wherein the method further comprises:
receiving, by the line card, a first registration message sent by a first switch fabric card that is optically interconnected to the line card, wherein the first registration message carries fabric card information of the first switch fabric card and a fabric card identity of the first switch fabric card; and
recording, by the line card, the fabric card information of the first switch fabric card and the fabric card identity of the first switch fabric card based on the first registration message.

6. The method according to claim 5, wherein after the recording the fabric card information of the first switch fabric card and the fabric card identity of the first switch fabric card, the method further comprises:
forwarding, by the line card, the first registration message to a switch fabric card that is optically interconnected to the line card, wherein the switch fabric card that is optically interconnected to the line card records the fabric card information of the first switch fabric card and the fabric card identity of the first switch fabric card.

7. The method according to claim 1, wherein the method further comprises:
calculating, by the line card, a path delay from the line card to a destination line card; and
sending a data packet to the destination line card based on the path delay.

8. The method according to claim 1, wherein the method further comprises:
when detecting that a switch fabric card that is optically interconnected to the line card is disconnected, releasing, by the line card, a locally recorded fabric card identity that is allocated to the disconnected switch fabric card.

9. A switch fabric card registration method, applied to a first switch fabric card, wherein the first switch fabric card comprises a switch fabric chip, wherein the switch fabric chip is optically interconnected to a fabric interface chip of at least one line card, and wherein the method comprises:
receiving, by the first switch fabric card through an optical interconnect path, line card information of the line card sent by the line card;
registering, by the first switch fabric card, the line card based on the line card information;
obtaining, by the first switch fabric card, a fabric card identity of the first switch fabric card through the optical interconnect path;
obtaining, by the first switch fabric card, fabric card information of the first switch fabric card; and
sending, by the first switch fabric card, the fabric card information to the at least one line card through the optical interconnect path, wherein the at least one line card registers the first switch fabric card based on the fabric card information.

10. The method according to claim 9, wherein the receiving, by the first switch fabric card through an optical interconnect path, line card information of the line card sent by the line card; and registering, by the first switch fabric card, the line card based on the line card information comprises:
receiving, by the first switch fabric card, a first registration message sent by a line card that is optically interconnected to the first switch fabric card, wherein the first registration message carries the line card information of the line card and a line card identity of the line card; and
recording, by the first switch fabric card, the line card information of the line card and the line card identity of the line card based on the first registration message.

11. The method according to claim 10, wherein after the recording, by the first switch fabric card, the line card information of the line card and the line card identity of the line card based on the first registration message, the method further comprises:
adding, by the first switch fabric card, the fabric card identity of the first switch fabric card into the first registration message; and
forwarding the first registration message into which the fabric card identity of the first switch fabric card is added to a line card that is optically interconnected to the first switch fabric card, wherein the line card that is optically interconnected to the first switch fabric card records the line card information.

12. The method according to claim 11, wherein after the forwarding the first registration message into which the fabric card identity of the first switch fabric card is added to a line card that is optically interconnected to the first switch fabric card, the method further comprises:
after receiving a first registration acknowledgement response, forwarding, by the first switch fabric card, the first registration acknowledgement response to the line card, wherein the first registration acknowledgement response is generated by the line card that is optically interconnected to the first switch fabric card, and wherein the first registration acknowledgement response carries line card information of line cards in an optical interconnect path at which the line card is located.

13. The method according to claim 9, wherein at least one second switch fabric card comprises a master switch fabric card, and wherein the obtaining, by the first switch fabric card, the fabric card identity of the first switch fabric card through the optical interconnect path comprises:
sending, by the first switch fabric card, a first request message to the master switch fabric card through the optical interconnect path, wherein the first request message is used to request to obtain the fabric card identity of the first switch fabric card; and
receiving, by the first switch fabric card, a second request response through the optical interconnect path, wherein the second request response carries the fabric card identity that is allocated to the first switch fabric card by the master switch fabric card based on the first request message.

14. The method according to claim 9, wherein the sending, by the first switch fabric card, the fabric card information to the at least one line card through the optical interconnect path comprises:
sending, by the first switch fabric card, a first registration message to a worker line card that is optically interconnected to the first switch fabric card, wherein the first registration message carries the fabric card information of the first switch fabric card and the fabric card identity of the first switch fabric card, wherein the worker line card records the fabric card information of the first switch fabric card and the fabric card identity of the first switch fabric card, and wherein the worker line card is a line card in the at least one line card.

15. The method according to claim 14, wherein after the sending a first registration message to a worker line card that is optically interconnected to the first switch fabric card, the method further comprises:

receiving, by the first switch fabric card, a second registration acknowledgement response sent by the worker line card, wherein the second registration acknowledgement response is generated by a switch fabric card that is optically interconnected to the worker line card, and wherein the second registration acknowledgement response carries fabric card information of switch fabric cards in the optical interconnect path at which the first switch fabric card is located.

16. A line card, wherein the line card comprises a fabric interface chip, wherein the fabric interface chip is optically interconnected to a switch fabric chip in at least one switch fabric card by using an optical fiber, and wherein:

the fabric interface chip is configured to:
send a first request message to a master switch fabric card through an optical interconnect path, wherein the first request message is used to request to obtain a line card identity of the line card;
receive a first request response through the optical interconnect path, wherein the first request response carries the line card identity that is allocated to the line card by the master switch fabric card based on the first request message;
obtain line card information of the line card; and
send the line card information to the at least one switch fabric card through the optical interconnect path, wherein the at least one switch fabric card registers the line card based on the line card information.

* * * * *